United States Patent
Wu et al.

(10) Patent No.: US 12,464,412 B2
(45) Date of Patent: Nov. 4, 2025

(54) COORDINATED SIDELINK COMMUNICATION

(71) Applicant: QUALCOMM Incorporated, San Diego, CA (US)

(72) Inventors: Shuanshuan Wu, San Diego, CA (US); Junyi Li, Fairless Hills, PA (US); Kapil Gulati, Belle Mead, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 457 days.

(21) Appl. No.: 17/707,652

(22) Filed: Mar. 29, 2022

(65) Prior Publication Data

US 2023/0319647 A1 Oct. 5, 2023

(51) Int. Cl.
*H04W 28/26* (2009.01)
*H04B 17/318* (2015.01)
*H04W 92/18* (2009.01)

(52) U.S. Cl.
CPC .......... *H04W 28/26* (2013.01); *H04B 17/318* (2015.01); *H04W 92/18* (2013.01)

(58) Field of Classification Search
CPC ... H04W 28/26; H04W 92/18; H04W 72/541; H04W 72/40; H04W 72/25; H04B 17/318
See application file for complete search history.

(56) References Cited

U.S. PATENT DOCUMENTS

2021/0144736 A1* 5/2021 Li .................... H04W 72/02
2021/0219320 A1* 7/2021 Belleschi .......... H04W 72/20

OTHER PUBLICATIONS

CATT: "Remaining Issues on Mode 1 Resource Allocation in NR V2X", 3GPP TSG RAN WG1 Meeting #100bis, R1-2002077, 3rd Generation Partnership Project (3GPP), Mobile Competence Centre, 650, Route Des Lucioles, F-06921, Sophia-Antipolis Cedex, France, vol. RAN WG1, No. Online Meeting, Apr. 20, 2020-Apr. 30, 2020, Apr. 11, 2020, 8 Pages, XP051875434, 2.2.3 PUCCH Collision Between SL HARQ Report and Uu HARQ Report.
International Search Report and Written Opinion—PCT/US2023/063343—ISA/EPO—May 30, 2023.

* cited by examiner

*Primary Examiner* — Dady Chery
(74) *Attorney, Agent, or Firm* — Loza & Loza, LLP

(57) ABSTRACT

Aspects relate to techniques for sidelink transmissions scheduled by network entities. A UE may receive a resource reservation message from a transmitting UE indicating resources granted by a network entity for a first sidelink transmission. The UE may detect a conflict between the first sidelink transmission and a second sidelink transmission and transmit a conflict indication in response to detecting the conflict. The UE may transmit the conflict indication to the transmitting UE or to the network entity. In some examples, the transmitting UE receiving the conflict indication may report the conflict to the network entity.

30 Claims, 17 Drawing Sheets

COORDINATED SIDELINK COMMUNICATION

TECHNICAL FIELD

The technology discussed below relates generally to wireless communication networks, and more particularly, to detecting conflicts for coordination of sidelink communication.

BACKGROUND

Wireless communication between devices may be facilitated by various network configurations. In one configuration, a cellular network may enable user equipment (UEs) to communicate with one another through signaling with a nearby base station or cell. Another wireless communication network configuration is a device to device (D2D) network in which UEs may signal one another directly, rather than via an intermediary base station or cell. For example, D2D communication networks may utilize sidelink signaling to facilitate the direct communication between UEs over a proximity service (ProSe) PC5 interface. In some sidelink network configurations, UEs may further communicate in a cellular network, generally under the control of a base station. Thus, the UEs may be configured for uplink and downlink signaling via a base station and further for sidelink signaling directly between the UEs without transmissions passing through the base station.

Resources in a sidelink network may be reserved in two different modes. In a first mode, e.g., "Mode 1", a base station may allocate resources to UEs for sidelink communication therebetween. In Mode 1, sidelink feedback may be reported between the UEs and further reported back to the base station. In a second mode, e.g., "Mode 2", the UEs may autonomously select sidelink resources for sidelink communication therebetween. In Mode 2, sidelink feedback may be transmitted between the UEs.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a user equipment (UE) configured for wireless communication is disclosed. The UE includes a transceiver, a memory, and a processor coupled to the transceiver and the memory. The processor is configured to receive a first resource reservation message via the transceiver from a first transmitting UE indicating a first resource granted by a first network entity for a first sidelink transmission, and transmit a conflict indication via the transceiver in response to detecting a conflict between the first sidelink transmission and a second sidelink transmission scheduled on a second resource within a same slot as the first resource.

Another example provides a method for wireless communication at a user equipment (UE). The method includes receiving a first resource reservation message from a first transmitting UE indicating a first resource granted by a first network entity for a first sidelink transmission and transmitting a conflict indication in response to detecting a conflict between the first sidelink transmission and a second sidelink transmission scheduled on a second resource within a same slot as the first resource.

Another example provides a user equipment (UE) configured for wireless communication. The UE includes a transceiver, a memory, and a processor coupled to the transceiver and the memory. The processor is configured to transmit a resource reservation message via the transceiver indicating a first resource granted by a network entity for a first sidelink transmission and receive a conflict indication via the transceiver from a receiving UE of the resource reservation message. The conflict indication indicates a conflict between the first sidelink transmission and a second sidelink transmission scheduled on a second resource within a same slot as the first resource. The processor is further configured to cancel transmission of the first sidelink transmission.

Another example provides A method for wireless communication at a user equipment (UE). The method includes transmitting a resource reservation message indicating a first resource granted by a network entity for a first sidelink transmission and receiving a conflict indication from a receiving UE of the resource reservation message. The conflict indication indicates a conflict between the first sidelink transmission and a second sidelink transmission scheduled on a second resource within a same slot as the first resource. The method further includes canceling transmission of the first sidelink transmission.

These and other aspects will become more fully understood upon a review of the detailed description, which follows. Other aspects, features, and examples will become apparent to those of ordinary skill in the art, upon reviewing the following description of specific, exemplary examples of in conjunction with the accompanying figures. While features may be discussed relative to certain examples and figures below, all examples can include one or more of the advantageous features discussed herein. In other words, while one or more examples may be discussed as having certain advantageous features, one or more of such features may also be used in accordance with the various examples discussed herein. In similar fashion, while exemplary examples may be discussed below as device, system, or method examples such exemplary examples can be implemented in various devices, systems, and methods.

DETAILED DESCRIPTION

Figure 1:
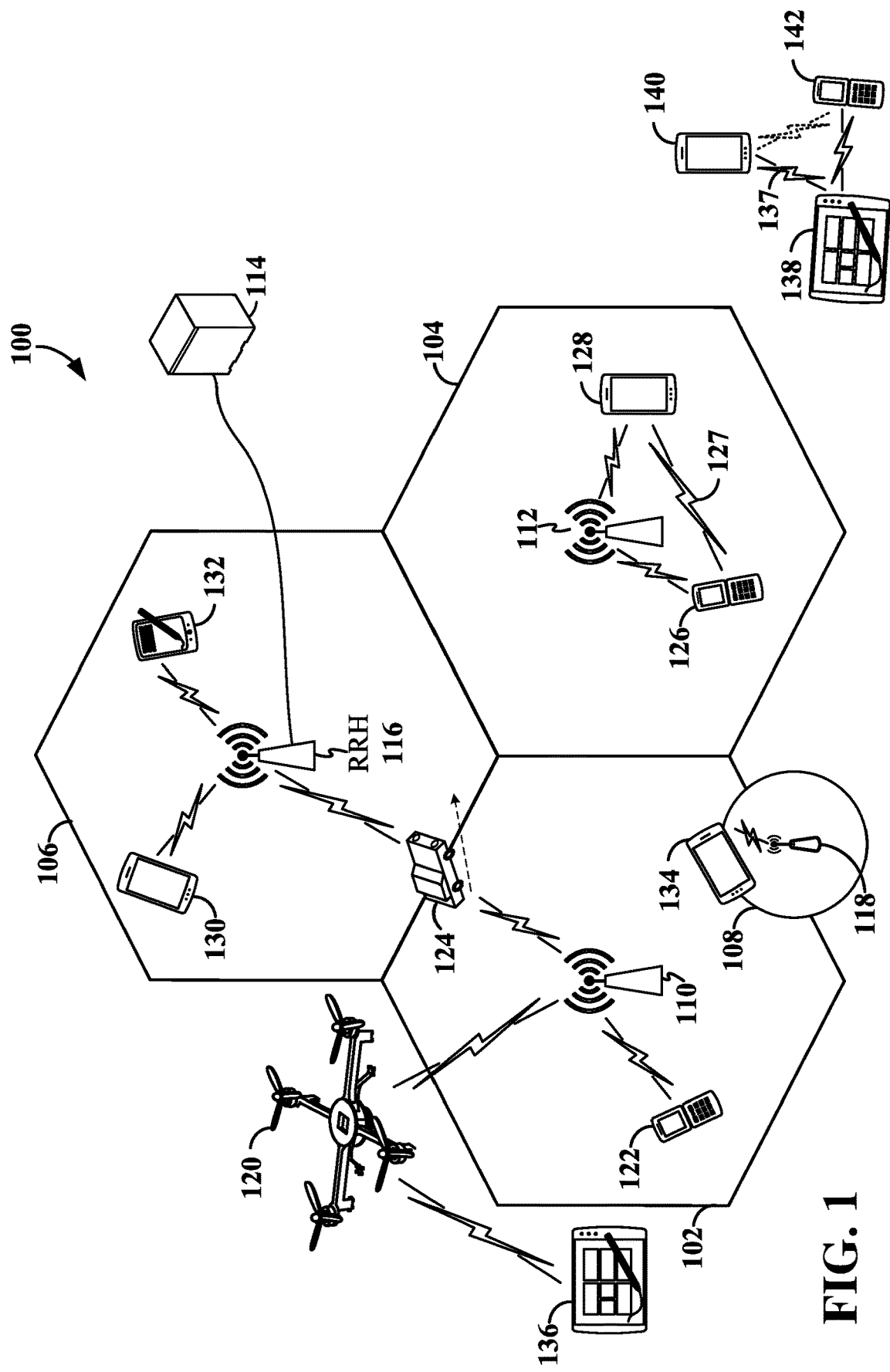
FIG. 1 is a diagram illustrating an example of a wireless radio access network according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Various aspects of the disclosure relate to mechanisms for coordinating sidelink communication by detecting and reporting conflicts between sidelink transmissions scheduled by network entities (e.g., base stations, such as gNBs). A UE may receive a resource reservation message from a transmitting UE indicating resources granted by a first network entity for a first sidelink transmission. The UE may detect a conflict between the first sidelink transmission and a second sidelink transmission and transmit a conflict indication in response to detecting the conflict. By coordinating sidelink communication, inter-cell interference of sidelink communication may be reduced, thus improving the reliability of sidelink communication. Moreover, coordinated sidelink communication may avoid missed sidelink transmissions due to the half-duplex constraint. In certain example implementations, the coordinated sidelink communication techniques presented herein may applied to or otherwise comprise coordinated Mode 1 sidelink communication or the like.

In some examples, the conflict may be detected based on the first and second sidelink transmissions being scheduled on resources within the same slot. In other examples, the conflict may be detected based on the first and second sidelink transmissions being scheduled on overlapping resources. In addition, the conflict may be detected based on the actual transmission of the first and second sidelink transmissions or based on the future scheduling of the first and second sidelink transmission.

In some examples, the UE may be a third UE (e.g., a standby UE) that detects the conflict between two transmitting UEs. In this example, the UE may transmit the conflict indication to one of the two transmitting UEs. In some examples, the transmitting UE receiving the conflict indication (e.g., the transmitting UE of the first sidelink transmission) may cancel the first sidelink transmission. In addition, the transmitting UE may report the conflict to the first network entity. The first network entity may then reschedule the first sidelink transmission.

In some examples, the UE detecting the conflict may be involved in the conflict. For example, the UE may be a transmitting UE of the second sidelink transmission. In this example, the UE may receive a grant from a second network entity for the second sidelink transmission. Upon detecting the conflict, the UE may cancel the second sidelink transmission. In addition, the UE may transmit the conflict indication to the second network entity. The conflict indication may be transmitted to the second network entity after a time at which the conflict would have occurred or prior to the time at which the conflict is scheduled to occur. In the latter, the second network entity may reallocate the resources granted for the second sidelink transmission. In some examples, the UE detecting the conflict may be both the transmitting UE of the second sidelink transmission and a receiving UE of the first sidelink transmission. For example, the UE may determine that in a slot having a resource granted by the second network entity for the second sidelink transmission, the UE needs to receive the first sidelink transmission in a resource reserved by the transmitting UE based on the grant by first network entity. In this example, the UE may either cancel the second sidelink transmission and transmit the conflict indication to the second network entity or transmit the conflict indication to the transmitting UE and the transmitting UE may cancel the first sidelink transmission.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes, and constitution.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided. The RAN 100 may implement any suitable wireless communication technology or technologies to provide radio access. As one example, the RAN 100 may operate according to $3^{rd}$ Generation Partnership Project (3GPP) New Radio (NR) specifications, often referred to as 5G. As another example, the RAN 100 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

The geographic region covered by the radio access network 100 may be divided into a number of cellular regions (cells) that can be uniquely identified by a user equipment (UE) based on an identification broadcasted over a geographical area from one access point or base station. FIG. 1 illustrates cells 102, 104, 106, and cell 108, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a respective base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 100 operates according to both the LTE and 5G NR standards, one of the base stations may be an LTE base station, while another base station may be a 5G NR base station.

Various base station arrangements can be utilized. For example, in FIG. 1, two base stations 110 and 112 are shown in cells 102 and 104; and a third base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the base stations 110, 112, and 114 support cells having a large size. Further, a base station 118 is shown in the cell 108 which may overlap with one or more macrocells. In this example, the cell 108 may be referred to as a small cell (e.g., a microcell, picocell, femtocell, home base station, home Node B, home eNode B, etc.), as the base station 118 supports a cell having a relatively small size. Cell sizing can be done according to system design as well as component constraints.

It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes an unmanned aerial vehicle (UAV) 120, which may be a drone or quadcopter. The UAV 120 may be configured to function as a base station, or more specifically as a mobile base station. That is, in some examples, a cell may not necessarily be stationary, and the geographic area of the cell may move according to the location of a mobile base station such as the UAV 120.

In general, base stations may include a backhaul interface for communication with a backhaul portion (not shown) of the network. The backhaul may provide a link between a base station and a core network (not shown), and in some examples, the backhaul may provide interconnection between the respective base stations. The core network may be a part of a wireless communication system and may be independent of the radio access technology used in the radio access network. Various types of backhaul interfaces may be employed, such as a direct physical connection, a virtual network, or the like using any suitable transport network.

The RAN 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the RAN 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with base station 118; and UE 136 may be in communication with mobile base station 120. Here, each base station 110, 112, 114, 118, and 120 may be configured to provide an access point to a core network (not shown) for all the UEs in the respective cells. In some examples, the UAV 120 (e.g., the quadcopter) can be a mobile network node and may be configured to function as a UE. For example, the UAV 120 may operate within cell 102 by communicating with base station 110.

Wireless communication between a RAN 100 and a UE (e.g., UE 122 or 124) may be described as utilizing an air interface. Transmissions over the air interface from a base station (e.g., base station 110) to one or more UEs (e.g., UE 122 and 124) may be referred to as downlink (DL) transmission. In accordance with certain aspects of the present disclosure, the term downlink may refer to a point-to-multipoint transmission originating at a scheduling entity (described further below; e.g., base station 110). Another way to describe this scheme may be to use the term broadcast channel multiplexing. Transmissions from a UE (e.g., UE 122) to a base station (e.g., base station 110) may be referred to as uplink (UL) transmissions. In accordance with further aspects of the present disclosure, the term uplink may refer to a point-to-point transmission originating at a scheduled entity (described further below; e.g., UE 122).

For example, DL transmissions may include unicast or broadcast transmissions of control information and/or traffic information (e.g., user data traffic) from a base station (e.g., base station 110) to one or more UEs (e.g., UEs 122 and 124), while UL transmissions may include transmissions of control information and/or traffic information originating at a UE (e.g., UE 122). In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In some examples, access to the air interface may be scheduled, wherein a scheduling entity (e.g., a base station) allocates resources (e.g., time-frequency resources) for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 138, 140, and 142) may communicate with each other using sidelink signals 137 without relaying that communication through a base station. In some examples, the UEs 138, 140, and 142 may each function as a scheduling entity or transmitting sidelink device and/or a scheduled entity or a receiving sidelink device to schedule resources and communicate sidelink signals 137 therebetween without relying on scheduling or control information from a base station. In other examples, two or more UEs (e.g., UEs 126 and 128) within the coverage area of a base station (e.g., base station 112) may also communicate sidelink signals 127 over a direct link (sidelink) without conveying that communication through the base station 112. In this example, the base station 112 may allocate resources to the UEs 126 and 128 for the sidelink communication. In either case, such sidelink signaling 127 and 137 may be implemented in a peer-to-peer (P2P) network, a device-to-device (D2D) network, a vehicle-to-vehicle (V2V) network, a vehicle-to-everything (V2X) network, a mesh network, or other suitable direct link network.

In some examples, a D2D relay framework may be included within a cellular network to facilitate relaying of communication to/from the base station 112 via D2D links (e.g., sidelinks 127 or 137). For example, one or more UEs (e.g., UE 128) within the coverage area of the base station 112 may operate as relaying UEs to extend the coverage of the base station 112, improve the transmission reliability to one or more UEs (e.g., UE 126), and/or to allow the base station to recover from a failed UE link due to, for example, blockage or fading.

Two primary technologies that may be used by V2X networks include dedicated short range communication (DSRC) based on IEEE 802.11p standards and cellular V2X based on LTE and/or 5G (New Radio) standards. Various aspects of the present disclosure may relate to New Radio (NR) cellular V2X networks, referred to herein as V2X networks, for simplicity. However, it should be understood that the concepts disclosed herein may not be limited to a particular V2X standard or may be directed to sidelink networks other than V2X networks.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 100, the ability for a UE to communicate while moving, independent of their location, is referred to as mobility. The various physical channels between the UE and the RAN are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In some examples, a RAN 100 may enable mobility and handovers (i.e., the transfer of a UE's connection from one radio channel to another). For example, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In various implementations, the air interface in the RAN 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the RAN 100 may utilize one or more multiplexing and multiple access algorithms to enable simultaneous communication of the various devices. For example, 5G NR specifications provide multiple access for UL or reverse link transmissions from UEs 122 and 124 to base station 110, and for multiplexing DL or forward link transmissions from the base station 110 to UEs 122 and 124 utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 110 to UEs 122 and 124 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the RAN 100 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 2. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 2:
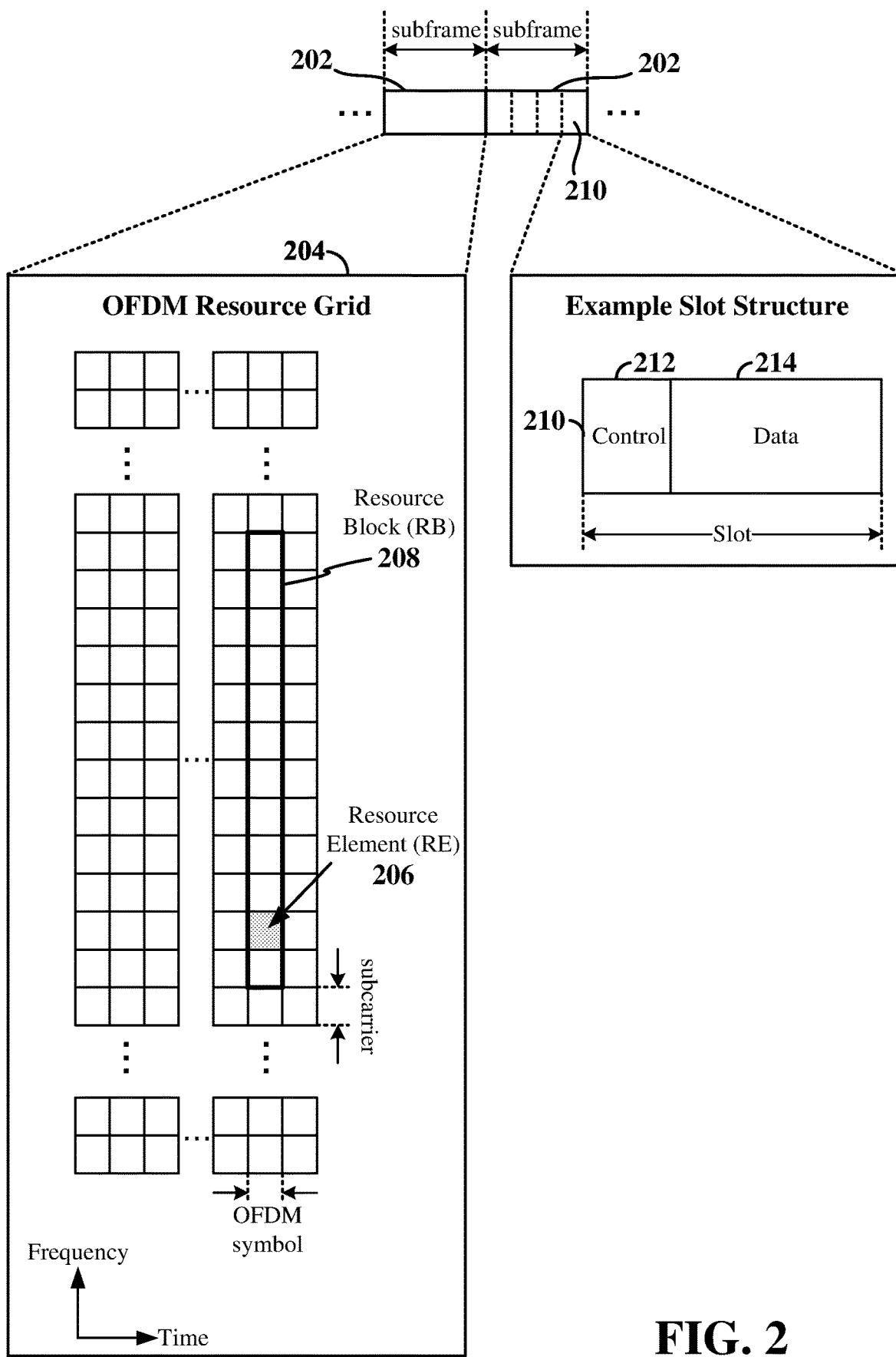
FIG. 2 is a diagram illustrating an example of a frame structure for use in a wireless communication network according to some aspects.

Referring now to FIG. 2, an expanded view of an exemplary subframe 202 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 204 may be used to schematically represent time-frequency resources for a given antenna port. That is, in a multiple-input-multiple-output (MIMO) implementation with multiple antenna ports available, a corresponding multiple number of resource grids 204 may be available for communication. The resource grid 204 is divided into multiple resource elements (REs) 206. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 208, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 208 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of UEs or sidelink devices (hereinafter collectively referred to as UEs) for downlink, uplink, or sidelink transmissions typically involves scheduling one or more resource elements 206 within one or more sub-bands or bandwidth parts (BWPs). Thus, a UE generally utilizes only a subset of the resource grid 204. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.) or may be self-scheduled by a UE/sidelink device implementing D2D sidelink communication.

In this illustration, the RB 208 is shown as occupying less than the entire bandwidth of the subframe 202, with some subcarriers illustrated above and below the RB 208. In a given implementation, the subframe 202 may have a bandwidth corresponding to any number of one or more RBs 208. Further, in this illustration, the RB 208 is shown as occupying less than the entire duration of the subframe 202, although this is merely one possible example.

Each 1 ms subframe 202 may consist of one or multiple adjacent slots. In the example shown in FIG. 2, one subframe 202 includes four slots 210, as an illustrative example. In some examples, a slot may be defined according to a specified number of OFDM symbols with a given cyclic prefix (CP) length. For example, a slot may include 7 or 12 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 210 illustrates the slot 210 including a control region 212 and a data region 214. In general, the control region 212 may carry control channels, and the data region 214 may carry data channels. Of course, a slot may contain all DL, all UL, or at least one DL portion and at least one UL portion. The structure illustrated in FIG. 2 is merely exemplary in nature, and different slot structures may be utilized, and may include one or more of each of the control region(s) and data region(s).

Although not illustrated in FIG. 2, the various REs 206 within a RB 208 may be scheduled to carry one or more physical channels, including control channels, shared channels, data channels, etc. Other REs 206 within the RB 208 may also carry pilots or reference signals. These pilots or reference signals may provide for a receiving device to perform channel estimation of the corresponding channel, which may enable coherent demodulation/detection of the control and/or data channels within the RB 208.

In some examples, the slot 210 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 206 (e.g., within the control region 212) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 206 (e.g., in the control region 212 or the data region 214) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 20, 80, or 120 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information.

In an UL transmission, the scheduled entity (e.g., UE) may utilize one or more REs 206 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 206 (e.g., within the data region 214) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 206 within the data region 214 may be configured to carry other signals, such as one or more SIBs and DMRSs.

In an example of sidelink communication over a sidelink carrier via a PC5 interface, the control region 212 of the slot 210 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 214 of the slot 210 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 206 within slot 210. For example, HARQ feedback information may be transmitted in a physical sidelink feedback channel (PSFCH) within the slot 210 from the receiving sidelink device to the transmitting sidelink device. In addition, one or more reference signals, such as a sidelink SSB, a sidelink CSI-RS, a sidelink SRS, a sidelink DMRS, and/or a sidelink positioning reference signal (PRS) may be transmitted within the slot 210.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 2 are not necessarily all of the channels or carriers that may be utilized between devices, and those of ordinary skill in the art will recognize that other channels or carriers may be utilized in addition to those illustrated, such as other traffic, control, and feedback channels.

Figure 3:
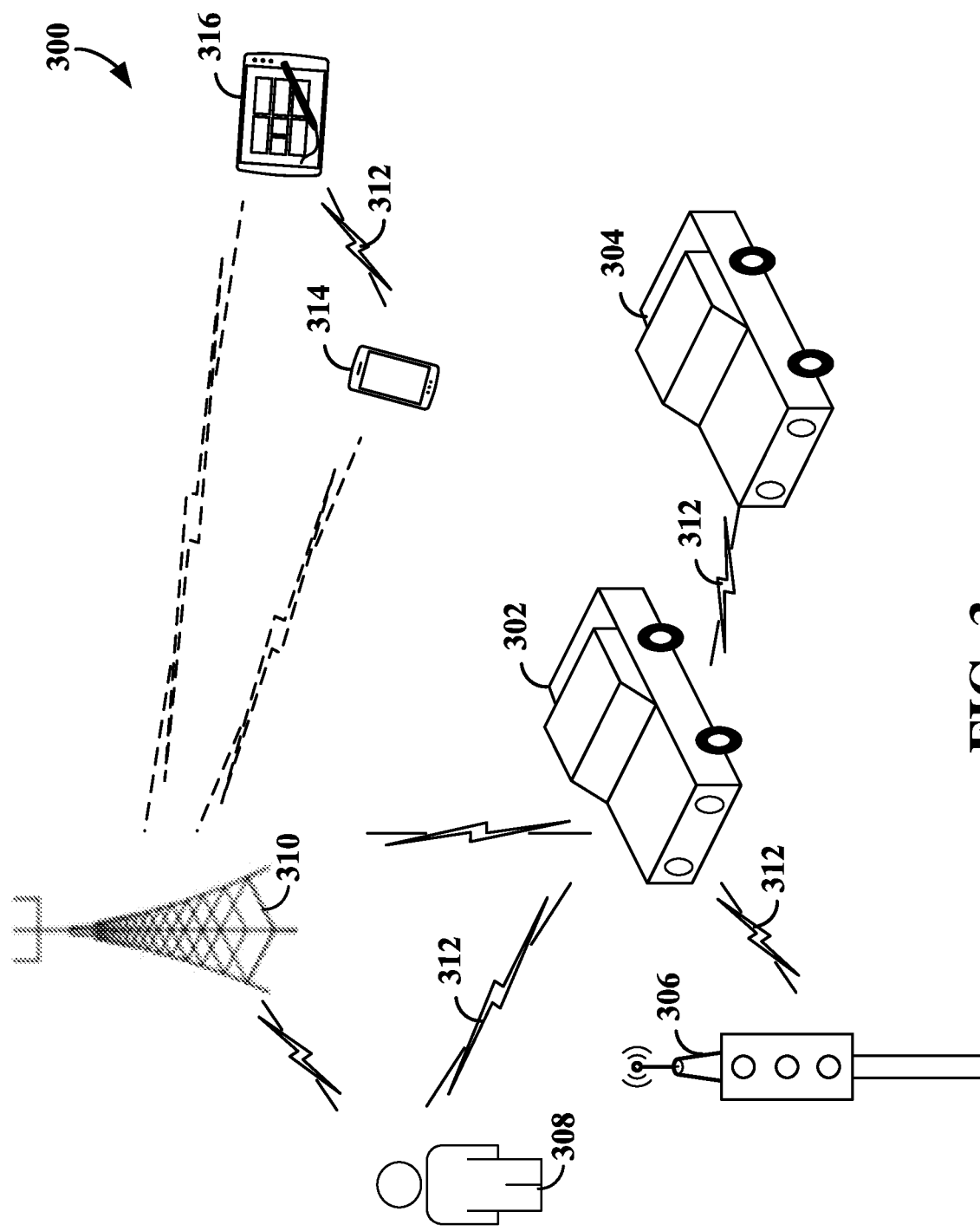
FIG. 3 is a diagram illustrating an example of a wireless communication network employing sidelink communication according to some aspects.

FIG. 3 illustrates an example of a wireless communication network 300 configured to support sidelink communication. In some examples, sidelink communication may include D2D or V2X communication. V2X communication involves the wireless exchange of information directly between not only vehicles (e.g., vehicles 302 and 304) themselves, but also directly between vehicles 302/304 and infrastructure (e.g., roadside units (RSUs) 306), such as streetlights, buildings, traffic cameras, tollbooths or other stationary objects, vehicles 302/304 and pedestrians 308, and vehicles 302/304 and wireless communication networks (e.g., base station 310). In some examples, V2X communication may be implemented in accordance with the New Radio (NR) cellular V2X standard defined by 3GPP, Release 16, or other suitable standard.

V2X communication enables vehicles 302 and 304 to obtain information related to the weather, nearby accidents, road conditions, activities of nearby vehicles and pedestrians, objects nearby the vehicle, and other pertinent information that may be utilized to improve the vehicle driving experience and increase vehicle safety. For example, such V2X data may enable autonomous driving and improve road safety and traffic efficiency. For example, the exchanged V2X data may be utilized by a V2X connected vehicle 302 and 304 to provide in-vehicle collision warnings, road hazard warnings, approaching emergency vehicle warnings, pre-/post-crash warnings and information, emergency brake warnings, traffic jam ahead warnings, lane change warnings, intelligent navigation services, and other similar information. In addition, V2X data received by a V2X connected mobile device of a pedestrian/cyclist 308 may be utilized to trigger a warning sound, vibration, flashing light, etc., in case of imminent danger.

The sidelink communication between vehicle-UEs (V-UEs) 302 and 304 or between a V-UE 302 or 304 and either an RSU 306 or a pedestrian-UE (P-UE) 308 may occur over a sidelink 312 utilizing a proximity service (ProSe) PC5 interface. In various aspects of the disclosure, the PC5 interface may further be utilized to support D2D sidelink 312 communication in other proximity use cases (e.g., other than V2X). Examples of other proximity use cases may include smart wearables, public safety, or commercial (e.g., entertainment, education, office, medical, and/or interactive) based proximity services. In the example shown in FIG. 3, ProSe communication may further occur between UEs 314 and 316.

ProSe communication may support different operational scenarios, such as in-coverage, out-of-coverage, and partial coverage. Out-of-coverage refers to a scenario in which UEs (e.g., UEs 314 and 316) are outside of the coverage area of a base station (e.g., base station 310), but each are still configured for ProSe communication. Partial coverage refers to a scenario in which some of the UEs (e.g., V-UE 304) are outside of the coverage area of the base station 310, while other UEs (e.g., V-UE 302 and P-UE 308) are in communication with the base station 310. In-coverage refers to a scenario in which UEs (e.g., V-UE 302 and P-UE 308) are in communication with the base station 310 (e.g., gNB) via a Uu (e.g., cellular interface) connection to receive ProSe service authorization and provisioning information to support ProSe operations.

To facilitate D2D sidelink communication between, for example, UEs 314 and 316 over the sidelink 312, the UEs 314 and 316 may transmit discovery signals therebetween. In some examples, each discovery signal may include a synchronization signal, such as a primary synchronization signal (PSS) and/or a secondary synchronization signal (SSS) that facilitates device discovery and enables synchronization of communication on the sidelink 312. For example, the discovery signal may be utilized by the UE 316 to measure the signal strength and channel status of a potential sidelink (e.g., sidelink 312) with another UE (e.g., UE 314). The UE 316 may utilize the measurement results to select a UE (e.g., UE 314) for sidelink communication or relay communication.

In 5G NR sidelink, sidelink communication may utilize transmission or reception resource pools. For example, the minimum resource allocation unit in frequency may be a sub-channel, which may include, for example, 10, 15, 20, 25, 50, 75, or 100 consecutive RBs, and the minimum resource allocation unit in time may be one slot. The number of sub-channels in a resource pool may include between one and twenty-seven. The configuration of the resource pool (RP) utilized between two sidelink devices for communication therebetween may be either pre-configured (e.g., a factory setting on the UE determined, for example, by sidelink standards or specifications) or provided by a base station (e.g., base station 310).

In addition, there may be two main resource allocation modes of operation for sidelink (e.g., PC5) communications. In a first mode, Mode 1, a base station (e.g., gNB) 310 may allocate resources to sidelink devices (e.g., V2X devices or other sidelink devices) for sidelink communication between the sidelink devices in various manners. For example, the base station 310 may allocate sidelink resources dynamically (e.g., a dynamic grant) to sidelink devices, in response to requests for sidelink resources from the sidelink devices. For example, the base station 310 may schedule the sidelink communication via DCI 3_0. In some examples, the base station 310 may schedule the PSCCH/PSSCH within uplink resources indicated in DCI 3_0. The base station 310 may further activate preconfigured sidelink grants (e.g., configured grants) for sidelink communication among the sidelink devices. In some examples, the base station 310 may activate a configured grant (CG) via RRC signaling. In Mode 1, sidelink feedback may be reported back to the base station 310 by a transmitting sidelink device.

In a second mode, Mode 2, the sidelink devices may autonomously select sidelink resources for sidelink communication therebetween. In some examples, a transmitting sidelink device may perform resource/channel sensing to select resources (e.g., sub-channels) on the sidelink channel that are unoccupied. Signaling on the sidelink is the same between the two modes. Therefore, from a receiver's point of view, there is no difference between the modes.

In some examples, sidelink (e.g., PC5) communication may be scheduled by use of sidelink control information (SCI). SCI may include two SCI stages. Stage 1 sidelink control information (first stage SCI) may be referred to herein as SCI-1. Stage 2 sidelink control information (second stage SCI) may be referred to herein as SCI-2.

SCI-1 may be transmitted on a physical sidelink control channel (PSCCH). SCI-1 may include information for resource allocation of a sidelink resource and for decoding of the second stage of sidelink control information (i.e., SCI-2). For example, SCI-1 may include a physical sidelink shared channel (PSSCH) resource assignment and a resource reservation period (if enabled). SCI-1 may further identify a priority level (e.g., Quality of Service (QoS)) of a PSSCH. For example, ultra-reliable-low-latency communication (URLLC) traffic may have a higher priority than text message traffic (e.g., short message service (SMS) traffic). Additionally, SCI-1 may include a PSSCH demodulation reference signal (DMRS) pattern (if more than one pattern is configured). The DMRS may be used by a receiver for radio channel estimation for demodulation of the associated physical channel. As indicated, SCI-1 may also include information about the SCI-2, for example, SCI-1 may disclose the format of the SCI-2. Here, the format indicates the resource size of SCI-2 (e.g., a number of REs that are allotted for SCI-2), a number of a PSSCH DMRS port(s), and a modulation and coding scheme (MCS) index. In some examples, SCI-1 may use two bits to indicate the SCI-2 format. Thus, in this example, four different SCI-2 formats may be supported. SCI-1 may include other information that is useful for establishing and decoding a PSSCH resource.

SCI-2 may be transmitted on the PSSCH and may contain information for decoding the PSSCH. According to some aspects, SCI-2 includes a 16-bit layer 1 (L1) destination identifier (ID), an 8-bit L1 source ID, a hybrid automatic repeat request (HARQ) process ID, a new data indicator (NDI), and a redundancy version (RV). For unicast communications, SCI-2 may further include a CSI report trigger. For groupcast communications, SCI-2 may further include a zone identifier and a maximum communication range for NACK. SCI-2 may include other information that is useful for establishing and decoding a PSSCH resource.

In some examples, the SCI (e.g., SCI-1 and/or SCI-2) may further include a resource assignment of resources reserved for one or more retransmissions of the sidelink transmission (e.g., the sidelink traffic/data) or for one or more additional (new) sidelink transmissions. Thus, the SCI may include a respective PSSCH resource reservation and assignment for one or more PSSCH transmissions. For example, the SCI may include a reservation message indicating the PSSCH resource reservation for the initial sidelink transmission (initial PSSCH) and one or more additional PSSCH resource reservations for one or more retransmissions of the PSSCH.

Figure 4A:
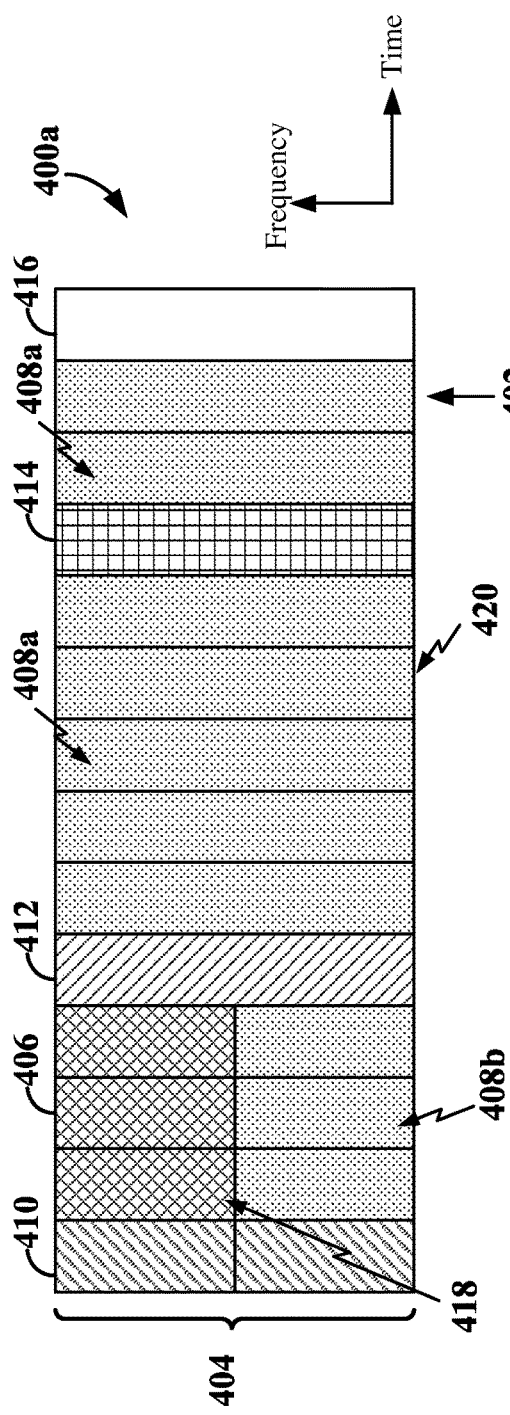
FIGS. 4A and 4B are diagrams illustrating examples of sidelink slot structures according to some aspects.
Figure 4B:
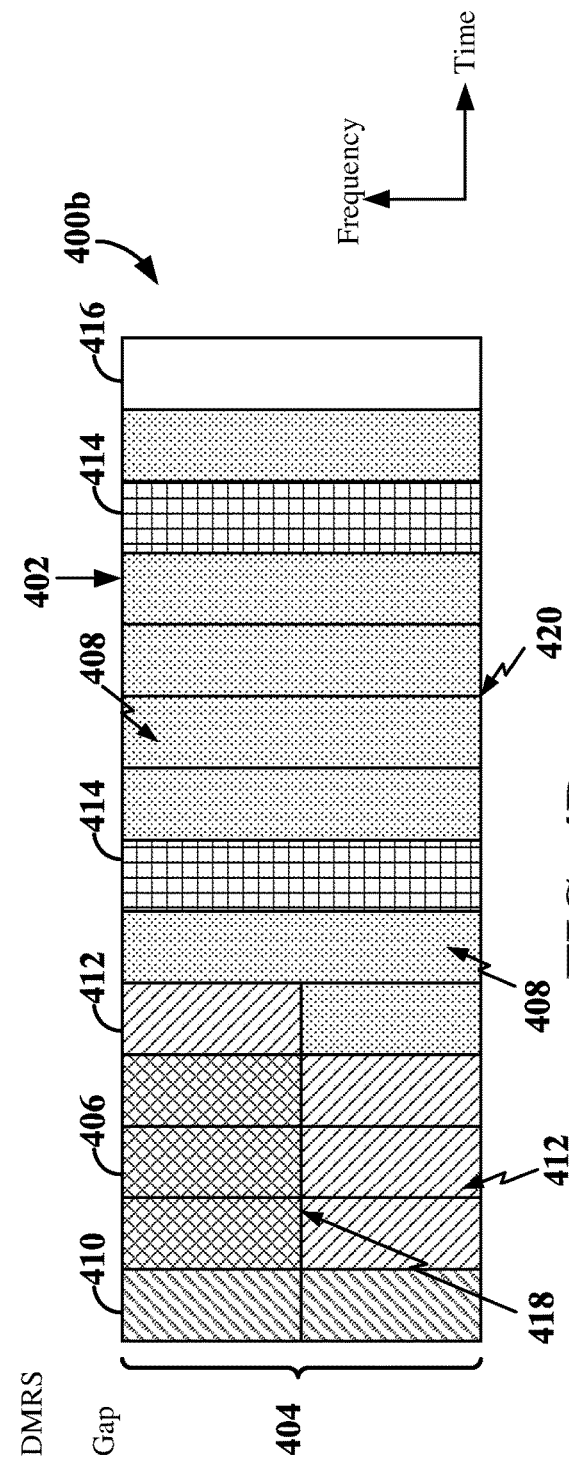

FIGS. 4A and 4B are diagrams illustrating examples of sidelink slot structures according to some aspects. The sidelink slot structures may be utilized, for example, in a V2X or other D2D network implementing sidelink. In the examples shown in FIGS. 4A and 4B, time is in the horizontal direction with units of symbols 402 (e.g., OFDM symbols); and frequency is in the vertical direction. Here, a carrier bandwidth 404 allocated for sidelink wireless communication is illustrated along the frequency axis. The carrier bandwidth 404 may include a plurality of sub-channels, where each sub-channel may include a configurable number of PRBs (e.g., 10, 15, 20, 25, 50, 75, or 100 PRBs).

Each of FIGS. 4A and 4B illustrate an example of a respective slot 400a or 400b including fourteen symbols 402 that may be used for sidelink communication. However, it should be understood that sidelink communication can be configured to occupy fewer than fourteen symbols in a slot 400a or 400b, and the disclosure is not limited to any particular number of symbols 402. Each sidelink slot 400a and 400b includes a physical sidelink control channel (PSCCH) 406 occupying a control region 418 of the slot 400a and 400b and a physical sidelink shared channel (PSSCH) 408 occupying a data region 420 of the slot 400a and 400b. The PSCCH 406 and PSSCH 408 are each transmitted on one or more symbols 402 of the slot 400a. The PSCCH 406 includes, for example, SCI-1 (e.g., SCI format 1-A) that schedules transmission of data traffic (e.g., a packet) on time-frequency resources of the corresponding PSSCH 408. As shown in FIGS. 4A and 4B, the PSCCH 406 and corresponding PSSCH 408 are transmitted in the same slot 400a and 400b. In other examples, the PSCCH 406 may schedule a PSSCH in a subsequent slot.

In some examples, the PSCCH 406 duration is configured to be two or three symbols. In addition, the PSCCH 406 may be configured to span a configurable number of PRBs, limited to a single sub-channel. The PSCCH resource size may be fixed for a resource pool (e.g., 10% to 100% of one sub-channel in the first two or three symbols). For example, the PSCCH 406 may occupy 10, 12, 15, 20, or 25 RBs of a single sub-channel. In each of the examples shown in FIGS. 4A and 4B, the starting symbol for the PSCCH 406 is the second symbol of the corresponding slot 400a or 400b and the PSCCH 406 spans three symbols 402. The PSCCH 406 may further include DMRSs.

The PSSCH 408 may be time-division multiplexed (TDMed) with the PSCCH 406 and/or frequency-division multiplexed (FDMed) with the PSCCH 406. In the example shown in FIG. 4A, the PSSCH 408 includes a first portion 408a that is TDMed with the PSCCH 406 and a second portion 408b that is FDMed with the PSCCH 406. In the example shown in FIG. 4B, the PSSCH 408 is TDMed with the PSCCH 406.

One and two layer transmissions of the PSSCH 408 may be supported with various modulation orders (e.g., QPSK, 16-QAM, 64-QAM and 256-QAM). In addition, the PSSCH 408 may include DMRSs 414 configured in a two, three, or four symbol DMRS pattern. For example, slot 400a shown in FIG. 4A illustrates a two symbol DMRS pattern, while slot 400b shown in FIG. 4B illustrates a three symbol DMRS pattern. In some examples, the transmitting UE can select the DMRS pattern and indicate the selected DMRS pattern in SCI-1, according to channel conditions. The DMRS pattern may be selected, for example, based on the number of PSSCH 408 symbols in the slot 400a or 400b. In some examples, the DMRSs 414 may be based on a Gold sequence and a configuration type 1 may be used for the frequency domain pattern of the PSSCH DMRSs 414. In addition, a gap symbol 416 is present after the PSSCH 408 in each slot 400a and 400b.

Each slot 400a and 400b further includes SCI-2 412 mapped to contiguous RBs in the PSSCH 408 starting from the first symbol containing a PSSCH DMRS. In the example shown in FIG. 4A, the first symbol containing a PSSCH DMRS is the fifth symbol occurring immediately after the last symbol carrying the PSCCH 406. Therefore, the SCI-2 412 is mapped to RBs within the fifth symbol. In the example shown in FIG. 4B, the first symbol containing a PSSCH DMRS is the second symbol, which also includes the PSCCH 406. In addition, the SCI-2/PSSCH DMRS 412 are shown spanning symbols two through five. As a result, the SCI-2/PSSCH DMRS 412 may be FDMed with the PSCCH 406 in symbols two through four and TDMed with the PSCCH 406 in symbol five.

The SCI-2 may be scrambled separately from the sidelink shared channel. In addition, the SCI-2 may utilize QPSK. When the PSSCH transmission spans two layers, the SCI-2 modulation symbols may be copied on (e.g., repeated on) both layers. The SCI-1 in the PSCCH 406 may be blind decoded at the receiving wireless communication device. However, since the format, starting location, and number of REs of the SCI-2 412 may be derived from the SCI-1, blind decoding of SCI-2 is not needed at the receiver (receiving UE).

In each of FIGS. 4A and 4B, the second symbol of each slot 400a and 400b is copied onto (repeated on) a first symbol 410 thereof for automatic gain control (AGC) settling. For example, in FIG. 4A, the second symbol containing the PSCCH 406 FDMed with the PSSCH 408b may be transmitted on both the first symbol and the second symbol. In the example shown in FIG. 4B, the second symbol containing the PSCCH 406 FDMed with the SCI-2/PSSCH DMRS 412 may be transmitted on both the first symbol and the second symbol.

Figure 5:
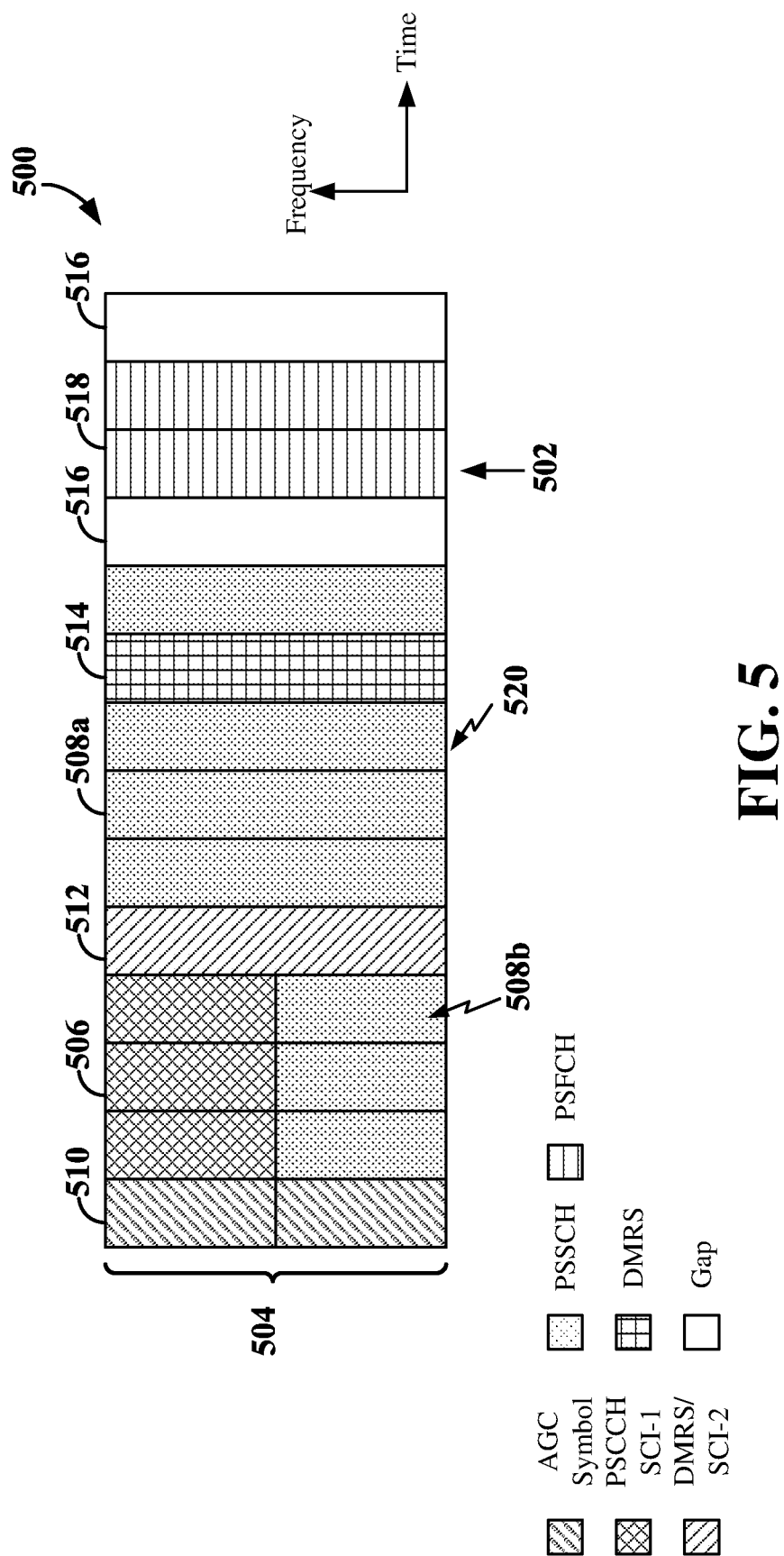
FIG. 5 is a diagram illustrating an example of a sidelink slot structure with feedback resources according to some aspects.

FIG. 5 is a diagram illustrating an example of a sidelink slot structure with feedback resources according to some aspects. The sidelink slot structure may be utilized, for example, in a V2X or other D2D network implementing sidelink. In the example shown in FIG. 5, time is in the horizontal direction with units of symbols 502 (e.g., OFDM symbols); and frequency is in the vertical direction. Here, a carrier bandwidth 504 allocated for sidelink wireless communication is illustrated along the frequency axis. A slot 500 having the slot structure shown in FIG. 5 includes fourteen symbols 502 that may be used for sidelink communication. However, it should be understood that sidelink communication can be configured to occupy fewer than fourteen symbols in a slot 500, and the disclosure is not limited to any particular number of symbols 502.

As in the examples shown in FIGS. 4A and 4B, the sidelink slot 500 includes a PSCCH 506 occupying a control region of the slot 500 and a PSSCH 508 occupying a data region 520 of the slot 500. The PSCCH 506 and PSSCH 508 are each transmitted on one or more symbols 502 of the slot 500. The PSCCH 506 includes, for example, SCI-1 that schedules transmission of data traffic (e.g., a packet) on time-frequency resources of the corresponding PSSCH 508. As shown in FIG. 5, the starting symbol for the PSCCH 506 is the second symbol of the slot 500 and the PSCCH 506 spans three symbols 502. The PSSCH 508 may be time-division multiplexed (TDMed) with the PSCCH 506 and/or frequency-division multiplexed (FDMed) with the PSCCH 506. In the example shown in FIG. 5, the PSSCH 508 includes a first portion 508a that is TDMed with the PSCCH 506 and a second portion 508b that is FDMed with the PSCCH 506.

The PSSCH 508 may further include DMRSs 514 configured in a two, three, or four symbol DMRS pattern. For example, slot 500 shown in FIG. 5 illustrates a two symbol DMRS pattern. In some examples, the transmitting UE can select the DMRS pattern and indicate the selected DMRS pattern in SCI-1, according to channel conditions. The DMRS pattern may be selected, for example, based on the number of PSSCH 508 symbols in the slot 500. In addition, a gap symbol 516 is present after the PSSCH 508 in the slot 500.

The slot 500 further includes SCI-2 512 mapped to contiguous RBs in the PSSCH 508 starting from the first symbol containing a PSSCH DMRS. In the example shown in FIG. 5, the first symbol containing a PSSCH DMRS is the fifth symbol occurring immediately after the last symbol carrying the PSCCH 506. Therefore, the SCI-2 512 is mapped to RBs within the fifth symbol.

In addition, as shown in FIG. 5, the second symbol of the slot 500 is copied onto (repeated on) a first symbol 510 thereof for automatic gain control (AGC) settling. For example, in FIG. 5, the second symbol containing the PSCCH 506 FDMed with the PSSCH 508b may be transmitted on both the first symbol and the second symbol.

For unicast and/or groupcast transmissions, HARQ feedback may further be transmitted on a physical sidelink feedback channel (PSFCH) 518 in a configurable resource period of 0, 1, 2, or 4 slots. In sidelink slots (e.g., slot 500) containing the PSFCH 518, one symbol 502 may be allocated to the PSFCH 518, and the PSFCH 518 may be copied onto (repeated on) a previous symbol for AGC settling. In the example shown in FIG. 5, the PSFCH 518 is transmitted on the thirteenth symbol and copied onto the twelfth symbol in the slot 500. A gap symbol 516 may further be placed after the PSFCH symbols 518.

In some examples, there is a mapping between the PSSCH 508 and the corresponding PSFCH resource. The mapping may be based on, for example, the starting sub-channel of the PSSCH 508, the slot containing the PSSCH 508, the source ID and the destination ID. In addition, the PSFCH can be enabled for unicast and groupcast communication. For unicast, the PSFCH may include one ACK/NACK bit. For groupcast, there may be two feedback modes for the PSFCH. In a first groupcast PSFCH mode, the receiving UE transmits only NACK, whereas in a second groupcast PSFCH mode, the receiving UE may transmit either ACK or NACK. The number of available PSFCH resources may be equal to or greater than the number of UEs in the second groupcast PSFCH mode.

For Mode 1 sidelink communication or the like, in which a base station configures the resource pool (RP) for UEs (sidelink devices) within the coverage area of a cell served by the base station, a UE may utilize the RP configuration provided by the base station for sidelink communication with other UEs in the same cell or a different cell. Thus, Mode 1 sidelink communication or the like may not limited to communication within a single cell. To facilitate inter-cell sidelink communication, the sidelink RP configuration may be aligned across cells. For example, if a slot is configured in a sidelink RP configuration in a serving cell, the same slot (e.g., same time resource) will also be configured in the sidelink RP configurations of neighboring cells. It should be noted that frame and/or slot numbers may vary between the cells even though the actual slots themselves (e.g., time resource/slot boundaries) remain the same across cells.

In cellular (Uu) communication, interference may occur between uplink transmissions of UEs in neighboring cells if the UEs are proximate to one another. For example, an uplink transmission by a first UE (e.g., UE1) within a first cell (e.g., cell A) may interfere with an uplink transmission by a second UE (e.g., UE2) in a second cell (e.g., cell B) when UE1 and UE2 are both cell edge UEs at the boundary between cell A and cell B. One of the approaches that is used in cellular networks to mitigate interference is soft frequency reuse. With soft frequency reuse, frequency resources for cell edge UEs in cell A may not be used to schedule cell edge UEs in neighboring cell B (though those same frequency resources may be used for cell center UEs in cell B). Thus, respective uplink transmissions by UE1 and UE2 may be scheduled in different frequency locations to reduce interference.

For sidelink communication, since the RP configuration is static among neighboring cells, a sidelink transmission by UE1 scheduled by a first base station (e.g., gNB1) in cell A may interfere with another sidelink communication scheduled by a second base station (e.g., gNB2) in cell B. However, the traditional soft frequency use mechanism used in cellular communication may not be applicable to sidelink communication since the sidelink RP includes contiguous frequency resources in a carrier, which may not be aligned with the planned Uu frequency resource in the carrier. In addition, sidelink resource allocation has limited flexibility in frequency resource allocation. For example, sidelink frequency resource allocation is in units of sub-channels, and if there is only one sub-channel configured in a sidelink RP pool, it is impossible to apply soft frequency reuse.

Figure 6:
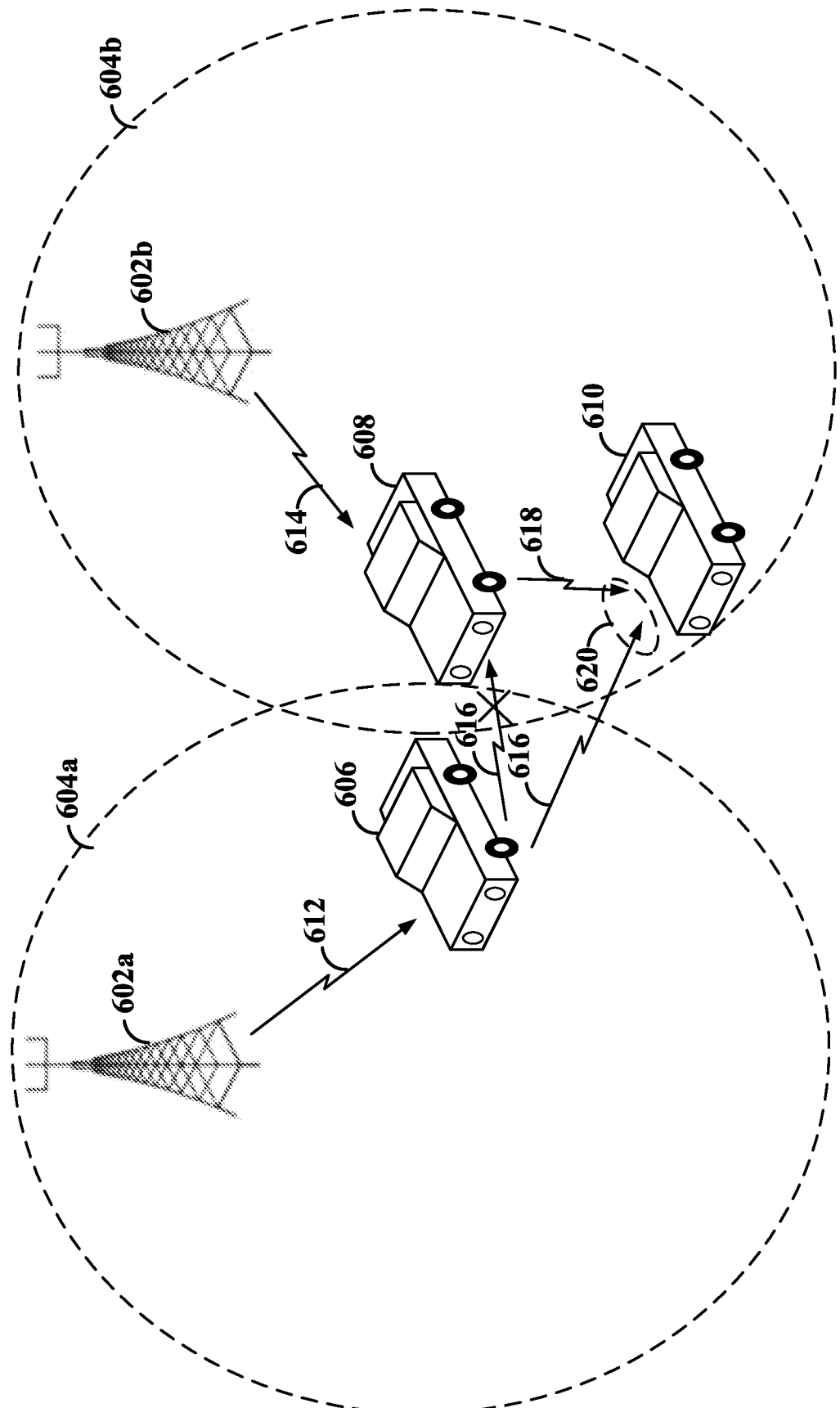
FIG. 6 is a diagram illustrating an example of sidelink interference according to some aspects.

FIG. 6 is a diagram illustrating an example of sidelink interference according to some aspects. In the example shown in FIG. 6, a first base station 602a is shown serving one or more UEs (e.g., UE 606) within a first cell 604a and a second base station 602b is shown serving one or more UEs (e.g., UEs 608 and 610) within a second cell 604b, where the first and second cells 604a and 604b are neighboring cells. Each of the UEs 606, 608, and 610 is configured for sidelink communication with other UEs within the same or neighboring cell. Each base station 602a and 602b configures a respective sidelink RP for the respective cells 604a and 604b and transmits the respective sidelink RP configuration (e.g., via an RRC message) to the corresponding UEs 606, 608, and 610 in the cells 604a and 604b. To support inter-cell sidelink communication, the sidelink RP configuration is aligned across the cells 604a and 604b, such that the same sidelink RP configuration is configured in both cell 604a and in cell 604b.

In the example shown in FIG. 6, both UE 606 and UE 608 are in sidelink communication with UE 610. Here, the sidelink communication between UE 606 and UE 610 is inter-cell sidelink communication (e.g., UE 606 is located within cell 604a, while UE 610 is located within cell 604b). The sidelink communication from UE 606 to UE 610 is scheduled by base station 602a, while the sidelink communication from UE 608 to UE 610 is scheduled by base station 602b. For example, base station 602a may schedule one or more sidelink resources for UE 606 to utilize in sidelink communications with UE 610. The base station 602a may then transmit a sidelink grant 612 to the UE 606 indicating the scheduled sidelink resources. In addition, the base station 602b may schedule one or more sidelink resources for UE 608 to utilize in sidelink communications with UE 610. The base station 602b may then transmit a sidelink grant 614 to the UE 608 indicating the scheduled sidelink resources.

In some examples, the scheduled sidelink resources may include an initial sidelink resource (e.g., of a minimum of one slot and one sub-channel) for an initial sidelink transmission (initial PSSCH) and one or more additional sidelink resources for one or more retransmissions of the PSSCH. In other examples, the scheduled sidelink resources may include one or more sidelink resources for one or more new (separate) PSSCH transmissions. Each of the UEs 608 and 610 may transmit a respective resource reservation message indicating the scheduled sidelink resources for one or more PSSCH transmissions by the UEs 608 and 610. For example, the resource reservation messages may include sidelink control information (e.g., SCI-1) indicating the scheduled sidelink resources. In an example, the SCI-1 may include a physical sidelink shared channel (PSSCH) resource assignment for an initial or first PSSCH transmission and may include PSSCH resource assignment(s) for one or more retransmissions or one or more future PSSCH transmissions (e.g., of other transport blocks).

Since the sidelink RP is aligned across cells 604a and 604b, each grant 612 and 614 may include the same sidelink resource (e.g., in time and frequency) or overlapping sidelink resources (e.g., overlapping in at least time). Thus, UE 606 may transmit a first sidelink transmission (e.g., PSSCH) 616 to the UE 610 on the same sidelink resource (or an overlapping sidelink resource) as a second sidelink transmission 618 from UE 608 to UE 610. As a result, UE 610 may experience interference between the first and second sidelink transmissions 616 and 618 transmitted from each of the UEs 606 and 608, thus preventing the UE 610 from receiving and decoding one or more of the first and second sidelink transmissions 616 and 618.

In some examples, as shown in FIG. 6, the UE 606 may transmit the first sidelink transmission 616 as a groupcast or broadcast transmission to both UE 610 and UE 608. Thus, UE 608 may be both a transmitting UE of the second sidelink transmission 618 and a receiving UE of the first sidelink transmission 616. In half-duplex communication, the frequencies utilized for transmission and reception are the same. Therefore, the UE 608 is constrained from transmitting and receiving at the same time. This constraint is referred to herein as a half-duplex (HD) constraint. Because of the HD constraint, when the UE 608 transmits the second sidelink transmission 618, the UE 608 is constrained from receiving the first sidelink transmission 616 (denoted by the X through the first sidelink transmission 616).

Various aspects of the disclosure relate to mechanisms for mitigating inter-cell interference in sidelink communication through coordinated sidelink communication. In some examples, inter-cell interference may be mitigated by detecting a conflict between the first and second sidelink transmissions 616 and 618. The conflict may be detected, for example, based on the sidelink resource reservation messages scheduling the first and second sidelink transmissions 616 and 618. In some examples, the conflict may be detected by one of the transmitting UEs (e.g., UE 606 or 608). In other examples, the conflict may be detected by a third UE. For example, the third UE may be a stand-by UE not involved in the sidelink transmissions 616 or 618 or the third UE may be a receiving UE (e.g., UE 610) of one or more of the sidelink transmissions 616 and 618.

Figure 7:
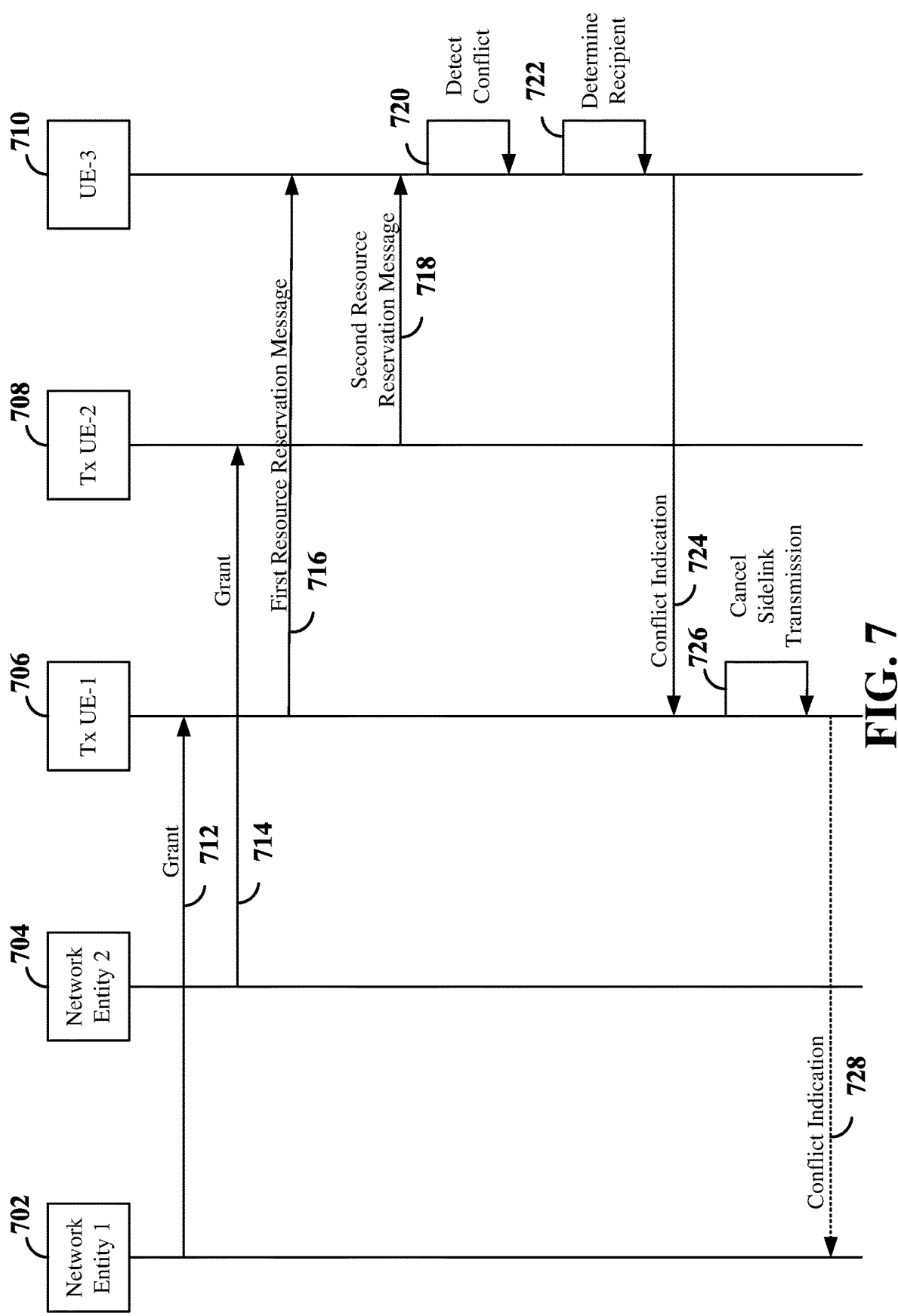
FIG. 7 is a diagram illustrating exemplary signaling for coordinated sidelink communication according to some aspects.

FIG. 7 is a diagram illustrating exemplary signaling for coordinated sidelink communication between a first network entity (Network Entity 1) 702, a second network entity (Network Entity 2) 704, a first transmitting (Tx) UE (Tx UE-1) 706, a second Tx UE (Tx UE-2) 708, and a third UE (UE-3) 710 according to some aspects. Each of the network entities 702 and 704 may correspond to any of the base stations (e.g., gNBs) shown in any of FIGS. 1, 3, and/or 6. In some examples, the network entities 702 and 704 may be implemented as an aggregated base station or a disaggregated base station. In a disaggregated base station architecture, each of the network entities 702 and 704 may include one or more of a central unit (CU), a distributed unit (DU), or a radio unit (RU). Each of the UEs 706, 708, and 710 may correspond, for example, to any of the UEs, sidelink devices, V2X devices, or other wireless communication devices shown in any of FIGS. 1, 3, and/or 6.

At 712, the first network entity 702 transmits a first grant to the first Tx UE 706 of sidelink resources for one or more sidelink transmissions (e.g., an initial PSSCH and one or more retransmissions of the PSSCH or one or more new PSSCHs). At 714, the second network entity 704 transmits a second grant to the second Tx UE 708 of sidelink resources for one or more sidelink transmissions (e.g., an initial PSSCH and one or more retransmissions of the PSSCH or one or more new PSSCHs).

At 716, the first Tx UE 706 transmits a first resource reservation message indicating a first resource granted by the first network entity 702 for a first sidelink transmission. In some examples, the first resource is a future resource for a future new PSSCH or a future retransmission of a PSSCH. For example, the first resource reservation message may be received in slot n, while the first resource is in slot n+k. At 718, the second Tx UE 708 transmits a second resource reservation message indicating a second resource granted by the second network entity 704 for a second sidelink transmission. Each of the first resource reservation message and the second resource reservation message may be received by the third UE 710.

At 720, the third UE 710 detects a conflict between the first sidelink transmission and the second sidelink transmission. For example, the third UE 710 may detect the conflict in response to the second resource being within a same slot as the first resource. In some examples, the third UE 710 may detect the conflict in response to the second resource at least partially overlapping the first resource in both time and frequency. In some examples, the first resource reservation message may include a first cell identifier (ID) associated with the first network entity 702 and the second resource reservation message may include a second cell ID associated with the second network entity 704. For example, the cell ID may be carried in SCI-2. In this example, the third UE 710 may detect the conflict based on a comparison between the first cell ID and the second cell ID. For example, the third UE 710 may compare the first cell ID and the second cell ID and detect the conflict in response to the first cell ID being different than the second cell ID.

In some examples, the third UE 710 may detect the conflict based on a respective measured reference signal received power (RSRP) of each of the first and second resource reservation messages. For example, the third UE 710 may identify a first RSRP of the first resource reservation message and a second RSRP of the second resource reservation message. The third UE 710 may detect the conflict in response to determining that one of the first RSRP or the second RSRP is above a first threshold RSRP.

In some examples, the third UE 710 may be an intended recipient of at least one of the first sidelink transmission or the second sidelink transmission (e.g., as indicated by the destination ID carried in the SCI-2). For example, the third UE 710 may be an intended recipient of the first sidelink transmission. In this example, the third UE 710 may detect the conflict in response to the measured RSRP of the first resource reservation message being below a second threshold RSRP. If the measured RSRP of the first resource reservation message is below the second threshold RSRP, the third UE 710 may not be able to decode the first sidelink transmission due to the inter-cell interference with the second sidelink transmission.

In some examples, the third UE 710 may detect the conflict based on a respective priority of each of the first and second sidelink transmissions (e.g., as indicated in the SCI-1 of each of the first and second resource reservation messages). For example, the third UE 710 may determine a first priority of the first sidelink transmission and a second priority of the second sidelink transmission. The third UE 710 may detect the conflict in response to one of the first priority or the second priority being lower than the other (e.g., the first priority being lower than the second priority or the second priority being lower than the first priority).

At 722, the third UE 710 determines a recipient of a conflict indication indicating the conflict. In this example, the recipient may be the first Tx UE 706 or the second Tx UE 708. In some examples, the third UE 710 may determine the conflict indication recipient in response to a comparison between the respective RSRP of each of the first and second resource reservation messages. For example, the third UE 710 may determine that the recipient of the conflict indication is the Tx UE 706 or 708 with the highest RSRP or the lowest RSRP. In some examples, the third UE 710 may detect the conflict in response to the cell IDs of the first and second resource reservations messages being different, and then determine the recipient based on the RSRPs of the first and second resource reservation messages (e.g., the recipient corresponds to the resource reservation message with the highest or lowest RSRP).

In examples in which the third UE 710 is the intended recipient of one of the first or second sidelink transmissions, the third UE may determine the conflict indication recipient as the Tx UE associated with the sidelink transmission intended for the third UE 710. In examples in which the third UE 710 is the intended recipient of both the first sidelink transmission and the second sidelink transmission, the third UE 710 may determine the conflict indication recipient based on the respective RSRPs of each of the first and second resource reservation messages. For example, the third UE 710 may determine the conflict indication recipient as the Tx UE with the highest or lowest RSRP.

In some examples, the third UE 710 determines the conflict indication recipient as the Tx UE associated with the resource reservation message having a measured RSRP above the first threshold RSRP. In this example, the third UE 710 may not be an intended recipient of either of the first or second sidelink transmissions.

In some examples, the third UE 710 determines the conflict indication recipient based on the respective priorities of each of the first and second sidelink transmissions. For example, the third UE 710 may determine that the Tx UE with the lower priority may be the conflict indication recipient. In this example, the third UE 710 may initially detect the conflict at 720 based on the overlapping resources or based on the overlapping resource and one or more of a cell ID difference, a priority difference between the sidelink transmissions, or RSRP measurements.

At 724, the third UE 710 transmits a conflict indication to the conflict indication recipient. In the example shown in FIG. 7, the conflict indication recipient is the first Tx UE 706. In some examples, the conflict indication may be transmitted within a first feedback slot associated with the first resource reservation message or the first sidelink transmission or within a second feedback slot associated with the second resource reservation message or the second sidelink transmission. Here, each feedback slot would normally be used for transmitting a PSFCH (e.g., HARQ feedback (ACK/NACK)) from receiving UEs (e.g., intended recipients of the resource reservation message/initial PSSCH transmission or the first/second sidelink transmission). In this example, the third UE 710 may transmit the conflict indication within unused PSFCH resources within one of the first feedback slot or the second feedback slot. In some examples, the third UE 710 may transmit the conflict indication within sidelink control information (e.g., SCI-2), a sidelink medium access control-control element (MAC-CE), or an additional (e.g., new) sidelink physical channel.

At 726, upon receiving a conflict indication for a future granted resource (e.g., the first resource) for the first sidelink transmission, the first Tx UE 706 cancels the first sidelink transmission in the first resource. In some examples, the first Tx UE 706 may then treat the cancellation as a failed transmission. For example, the physical layer (PHY) of the first Tx UE 706 may report a NACK to the MAC layer of the first Tx UE 706 for the first sidelink transmission for transmission of a NACK to the network entity 702. In this example, the procedure is transparent to the first network entity 702.

At 728, in addition to canceling the first sidelink transmission, the first Tx UE 706 may optionally report the conflict to the first network entity 702. Thus, the first Tx UE 706 can transmit an additional conflict indication to the first network entity 702. In some examples, the conflict indication may indicate a type of the conflict (e.g., inter-cell interference or half-duplex constraint).

In some examples, the first Tx UE 706 may transmit the additional conflict indication to the first network entity 702 after a time at which the conflict would have occurred. For example, the additional conflict indication may be transmitted within a Uu feedback (HARQ) resource. In this example, a dedicated HARQ codebook may be utilized to indicate the cancellation of the first sidelink transmission. In some examples, the additional conflict indication may be transmitted within a sidelink buffer status report (BSR). In this example, the sidelink BSR may include one or more fields indicating the conflict or cancellation of the first sidelink transmission due to the conflict. Based on the additional conflict indication, the first network entity 702 may grant another future resource to the first Tx UE 706 for the first sidelink transmission.

In some examples, the first Tx UE 706 may transmit the conflict indication to the first network entity 702 prior to a time at which the conflict is scheduled to occur. For example, the additional conflict indication may be transmitted within a scheduling request (SR) resource. In this example, the additional conflict indication indicates cancellation of the first sidelink transmission in the first resource. For example, the additional conflict indication may correspond to a negative SR indicating cancellation of the previously granted first resource. In some examples, the additional conflict indication may be transmitted within a Uu PUCCH resource or other uplink resource. Based on the additional conflict indication, the first network entity 702 may take one or more actions. For example, the first network entity 702 may re-allocate the first resource to one or more other UEs to avoid wasting the first resource. Alternatively or additionally, the first network entity 702 may grant another future resource to the first Tx UE 706 for the first sidelink transmission.

In some examples, the first network entity 702 may transmit a conflict report indicator to the first Tx UE 706 that enables or disables the transmission of a conflict indication to the first network entity 702. For example, the conflict report indicator may be included within the DCI scheduling the first sidelink transmission. The first Tx UE 706 may then transmit the conflict indication to the first network entity 702 in response to the conflict report indicator enabling transmission of the conflict indication. In addition, the first network entity 702 may further configure a reporting resource for the conflict indication (e.g., a PUCCH resource), which may be indicated by the DCI scheduling the first sidelink transmission.

In some examples, the first Tx UE 706 may report the conflict to the first network entity 702 in response to the conflict being persistent. For example, the first Tx UE 706 may transmit the conflict indication to the first network entity 702 in response to detecting a plurality of conflicts between a plurality of sidelink transmissions scheduled in overlapping resources. In some examples, the first network entity 702 and the second network entity 704 may allocate resources to the first Tx UE 706 and the second Tx UE 708, respectively, in a periodic manner. The first Tx UE 706 may transmit the conflict indication to the first network entity 702 if the allocated resources are overlapping in more than one period with the second Tx UE's reservation. In other examples, the first network entity 702 may grant more than one resource to the first Tx UE 706 (e.g., for the transmission of different PSSCHs or retransmissions of the same PSSCH), and the first Tx UE 706 may transmit the conflict indication if more than one of the granted resources are conflicting with reservations from other UEs.

Figure 8:
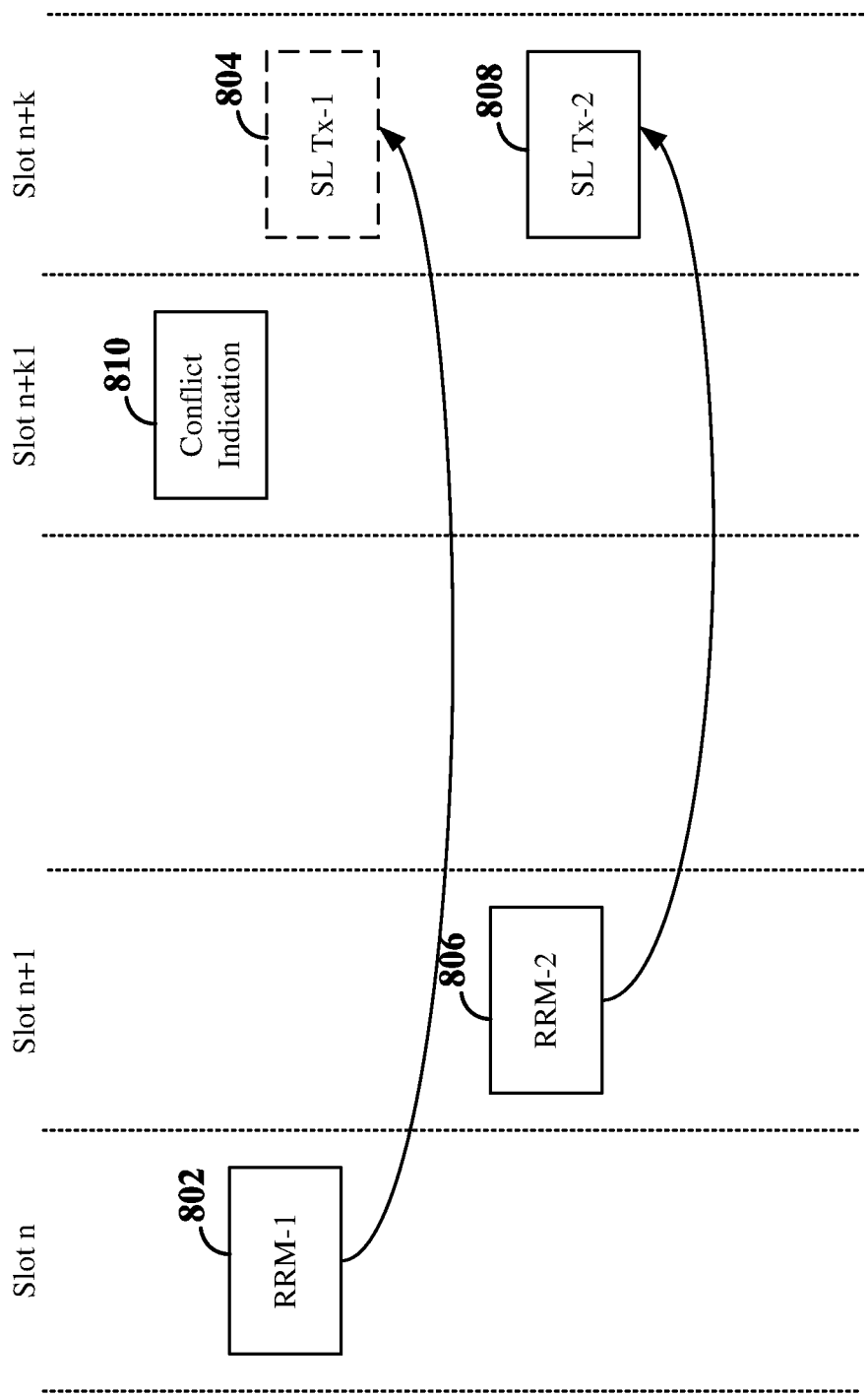
FIG. 8 is a diagram illustrating an exemplary conflict indication for conflicting sidelink transmissions according to some aspects.

FIG. 8 is a diagram illustrating an exemplary conflict indication for conflicting sidelink transmissions according to some aspects. In the example shown in FIG. 8, a first resource reservation message (RRM-1) 802 is transmitted in Slot n. The first resource reservation message 802 reserves resources for a first sidelink transmission (SL Tx-1) 804 in Slot n+k. In addition, a second resource reservation message (RRM-2) 806 is shown transmitted in Slot n+1 (though this nomenclature is merely exemplary, and the RRM-2 806 may be transmitted in a different Slot subsequent to Slot n). The second resource reservation message 806 reserves resources for a second sidelink transmission (SL Tx-2) 808 in the same slot (Slot n+k) as the first sidelink transmission 804. In some examples, the resources in Slot n+k reserved for the first and second sidelink transmissions 804 and 808 may further be overlapping (partially or completely) in frequency.

Upon detecting a conflict between the first and second sidelink transmissions 804 and 808, a UE (e.g., the third UE 710 shown in FIG. 7) may transmit a conflict indication 810 in Slot n+k1, which is prior to Slot n+k. In some examples, the Slot n+k1 may be determined based on Slot n (e.g., within a PSFCH resource associated with Slot n or a resource associated with a different channel or signal (e.g., SCI, sidelink MAC-CE, or a new physical channel). In other examples, the Slot n+k1 may be determined based on Slot n+k. For example, Slot n+k1 may be determined as Slot n+k-k2.

Figure 9:
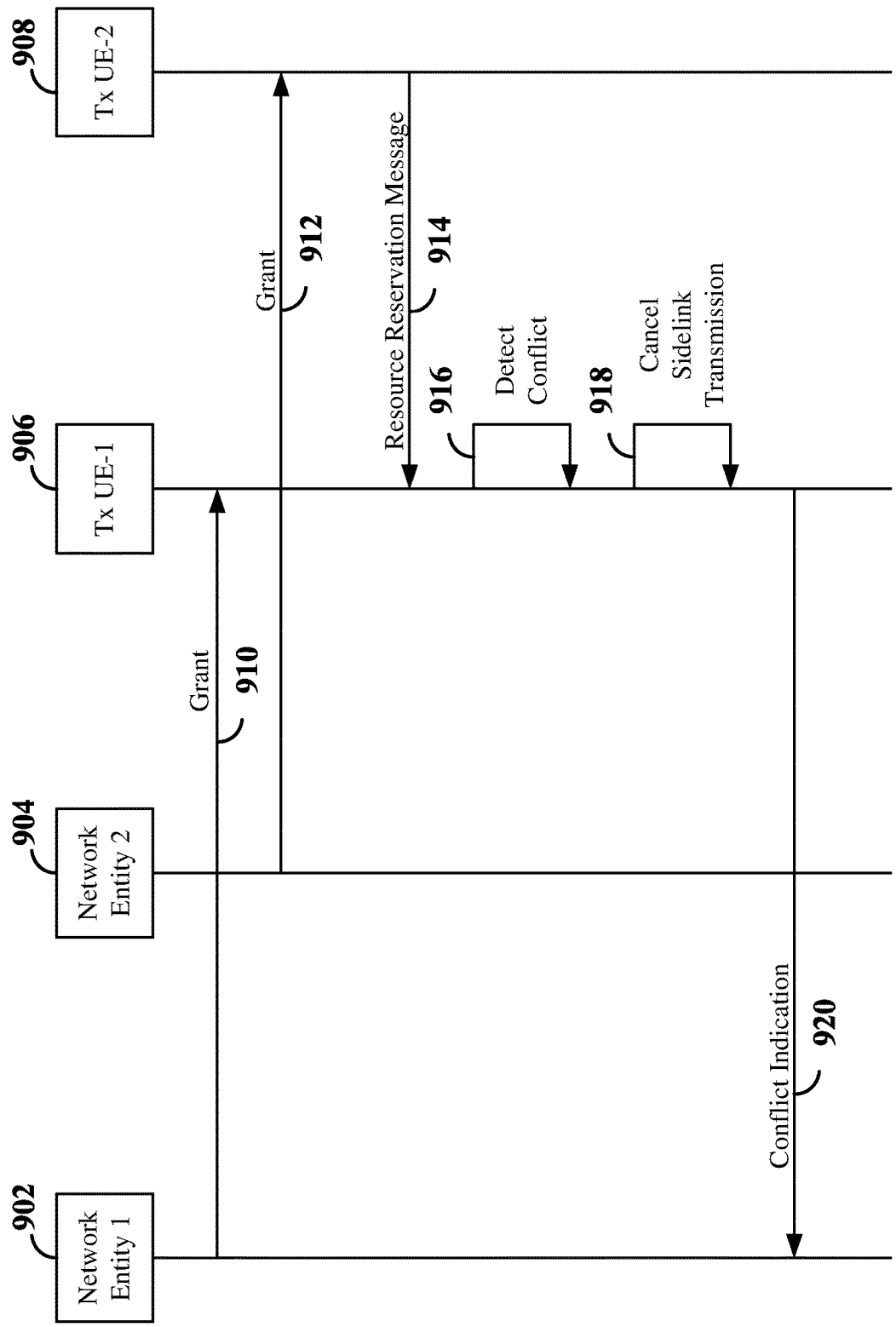
FIG. 9 is a diagram illustrating other exemplary signaling for coordinated sidelink communication according to some aspects.

FIG. 9 is a diagram illustrating exemplary signaling for coordinated sidelink communication between a first network entity (Network Entity 1) 902, a second network entity (Network Entity 2) 904, a first transmitting (Tx) UE (Tx UE-1) 906, and a second Tx UE (Tx UE-2) 908. Each of the network entities 902 and 904 may correspond to any of the base stations (e.g., gNBs) shown in any of FIGS. 1, 3, and/or 6. In some examples, the network entities 902 and 904 may be implemented as an aggregated base station or a disaggregated base station. In a disaggregated base station architecture, each of the network entities 902 and 904 may include one or more of a central unit (CU), a distributed unit (DU), or a radio unit (RU). Each of the UEs 906 and 908 may correspond, for example, to any of the UEs, sidelink devices, V2X devices, or other wireless communication devices shown in any of FIGS. 1, 3, and/or 6.

At 919, the first network entity 902 transmits a first grant to the first Tx UE 906 of sidelink resources for one or more sidelink transmissions (e.g., an initial PSSCH and one or more retransmissions of the PSSCH or one or more new PSSCHs). At 912, the second network entity 904 transmits a second grant to the second Tx UE 908 of sidelink resources for one or more sidelink transmissions (e.g., an initial PSSCH and one or more retransmissions of the PSSCH or one or more new PSSCHs).

At 914, the second Tx UE 908 transmits a first resource reservation message indicating a first resource granted by the second network entity 904 for a first sidelink transmission. In some examples, the first resource is a future resource for a future new PSSCH or a future retransmission of a PSSCH. For example, the first resource reservation message may be received in slot n, while the first resource is in slot n+k.

At 916, the first Tx UE 906 detects a conflict between the first sidelink transmission and a second sidelink transmission of the first Tx UE 906. The second sidelink transmission is scheduled on a second resource based on the first grant from the first network entity. For example, the first Tx UE 906 may detect the conflict in response to the second resource being within a same slot as the first resource. In some examples, the first Tx UE 906 may detect the conflict in response to the second resource at least partially overlapping the first resource in both time and frequency.

In some examples, the first Tx UE 906 may detect the conflict based on a measured reference signal received power (RSRP) of the first resource reservation message. For example, the first Tx UE 906 may detect the conflict in response to determining that the measured RSRP is above a threshold RSRP. In this example, the first Tx UE 906 may determine that the second Tx UE 908 is in close proximity to the first Tx UE, and as such, their respective first and second sidelink transmissions will interfere with one another. In some examples, in lieu of an RSRP measurement, the first Tx UE 906 may detect the conflict based on the respective locations of the first Tx UE 906 and the second Tx UE 908. The location of the second Tx UE 908 may be determined, for example, based on the Zone ID included in the first resource reservation message (e.g., SCI-2). For example, the first Tx UE 906 may determine a distance between the first Tx UE 906 and the second Tx UE 908. The first Tx UE 906 may then detect the conflict in response to the distance therebetween smaller than a distance threshold.

In some examples, the first Tx UE 906 may detect the conflict based on the respective priorities between the first sidelink transmission and the second sidelink transmission. For example, the first Tx UE 906 may detect the conflict in response to a first priority of the first sidelink transmission being higher than a second priority of the second sidelink transmission (e.g., the second Tx UE's sidelink transmission has a higher priority than the first Tx UE's sidelink transmission). In some examples, the first Tx UE 906 may detect the conflict further in response to the RSRP of the second Tx UE 908 being greater than the RSRP threshold (e.g., the RSRP of the first resource reservation message being greater than the RSRP threshold).

In some examples, the first Tx UE 906 may detect the conflict based on the respective timing of the first resource reservation message and a second resource reservation message for the second sidelink transmission transmitted by the first Tx UE 906. For example, the first Tx UE 906 may transmit the second resource reservation message in slot n+k1 and the second Tx UE 908 may transmit the first resource reservation message in slot n+k2. The first Tx UE 906 may detect the conflict in response to k2<k1.

In some examples, the first Tx UE 906 may detect the conflict in response to determining that the first Tx UE 906 is an intended recipient of the first sidelink transmission (e.g., as indicated in the destination ID of the first resource reservation message). In this example, the first Tx UE 906 may be prevented from both transmitting the second sidelink transmission and receiving the first sidelink transmission by the half-duplex constraint. As a result, the conflict may be detected if the first resource and second resource are within the same slot, whether or not the first and second resources are overlapping in frequency.

In response to detecting the conflict, at 918, the first Tx UE 906 cancels the second sidelink transmission granted by the first network entity 902 in the second resource. In some examples, the first Tx UE 906 may then treat the cancellation as a failed transmission. For example, the physical layer (PHY) of the first Tx UE 906 may report a NACK to the MAC layer of the first Tx UE 906 for the second sidelink transmission for transmission of a NACK to the first network entity 902. In this example, the procedure is transparent to the first network entity 902.

In examples in which the first Tx UE 906 detects the conflict based on the half-duplex constraint, the first Tx UE 906 may cancel the second sidelink transmission based on the respective priorities of the first and second sidelink transmissions. For example, the first Tx UE 906 may cancel the second sidelink transmission in response to the first sidelink transmission having a higher priority than the second sidelink transmission.

At 920, in addition to canceling the first sidelink transmission, the first Tx UE 906 may further report the conflict to the first network entity 902. Thus, the first Tx UE 906 can transmit a conflict indication to the first network entity 902. In some examples, the conflict indication may indicate a type of the conflict (e.g., inter-cell interference or half-duplex constraint). In examples in which the first resource reservation message carries the cell ID of the cell associated with the second Tx UE 908, the conflict indication may further include the cell ID associated with the second Tx UE 908.

In some examples, the first Tx UE 906 may transmit the conflict indication to the first network entity 902 after a time at which the conflict would have occurred. For example, the conflict indication may be transmitted within a Uu feedback (HARQ) resource. In this example, a dedicated HARQ codebook may be utilized to indicate the cancellation of the second sidelink transmission. In other examples, the conflict indication may be transmitted within a sidelink buffer status report (BSR). In this example, the sidelink BSR may include one or more fields indicating the conflict or cancellation of the second sidelink transmission due to the conflict. Based on the conflict indication, the first network entity 902 may grant another future resource to the first Tx UE 906 for the second sidelink transmission.

In some examples, the first Tx UE 906 may transmit the conflict indication to the first network entity 902 prior to a time at which the conflict is scheduled to occur. For example, the conflict indication may be transmitted within a scheduling request (SR) resource. In this example, the conflict indication indicates cancellation of the second sidelink transmission in the second resource. For example, the conflict indication may correspond to a negative SR indicating cancellation of the previously granted second resource. In some examples, the conflict indication may be transmitted within a Uu PUCCH resource or other uplink resource. Based on the conflict indication, the first network entity 902 may take one or more actions. For example, the first network entity 902 may re-allocate the first resource to one or more other UEs to avoid wasting the first resource. Alternatively or additionally, the first network entity 902 may grant another future resource to the first Tx UE 906 for the second sidelink transmission.

In some examples, the first network entity 902 may transmit a conflict report indicator to the first Tx UE 906 that enables or disables the transmission of a conflict indication to the first network entity 902. For example, the conflict report indicator may be included within the DCI scheduling the second sidelink transmission. The first Tx UE 906 may then transmit the conflict indication to the first network entity 902 in response to the conflict report indicator enabling transmission of the conflict indication. In addition, the first network entity 902 may further configure a reporting resource for the conflict indication (e.g., a PUCCH resource), which may be indicated by the DCI scheduling the second sidelink transmission.

In some examples, the first Tx UE 906 may report the conflict to the first network entity 902 in response to the conflict being persistent. For example, the first Tx UE 906 may transmit the conflict indication to the first network entity 902 in response to detecting a plurality of conflicts between a plurality of sidelink transmissions scheduled in overlapping resources. In some examples, the first network entity 902 and the second network entity 904 may allocate resources to the first Tx UE 906 and the second Tx UE 908, respectively, in a periodic manner. The first Tx UE 906 may transmit the conflict indication to the first network entity 902 if the allocated resources are overlapping in more than one period with the second Tx UE's reservation. In other examples, the first network entity 902 may grant more than one resource to the first Tx UE 906 (e.g., for the transmission of different PSSCHs or retransmissions of the same PSSCH), and the first Tx UE 906 may transmit the conflict indication if more than one of the granted resources are conflicting with reservations from other UEs.

Figure 10:
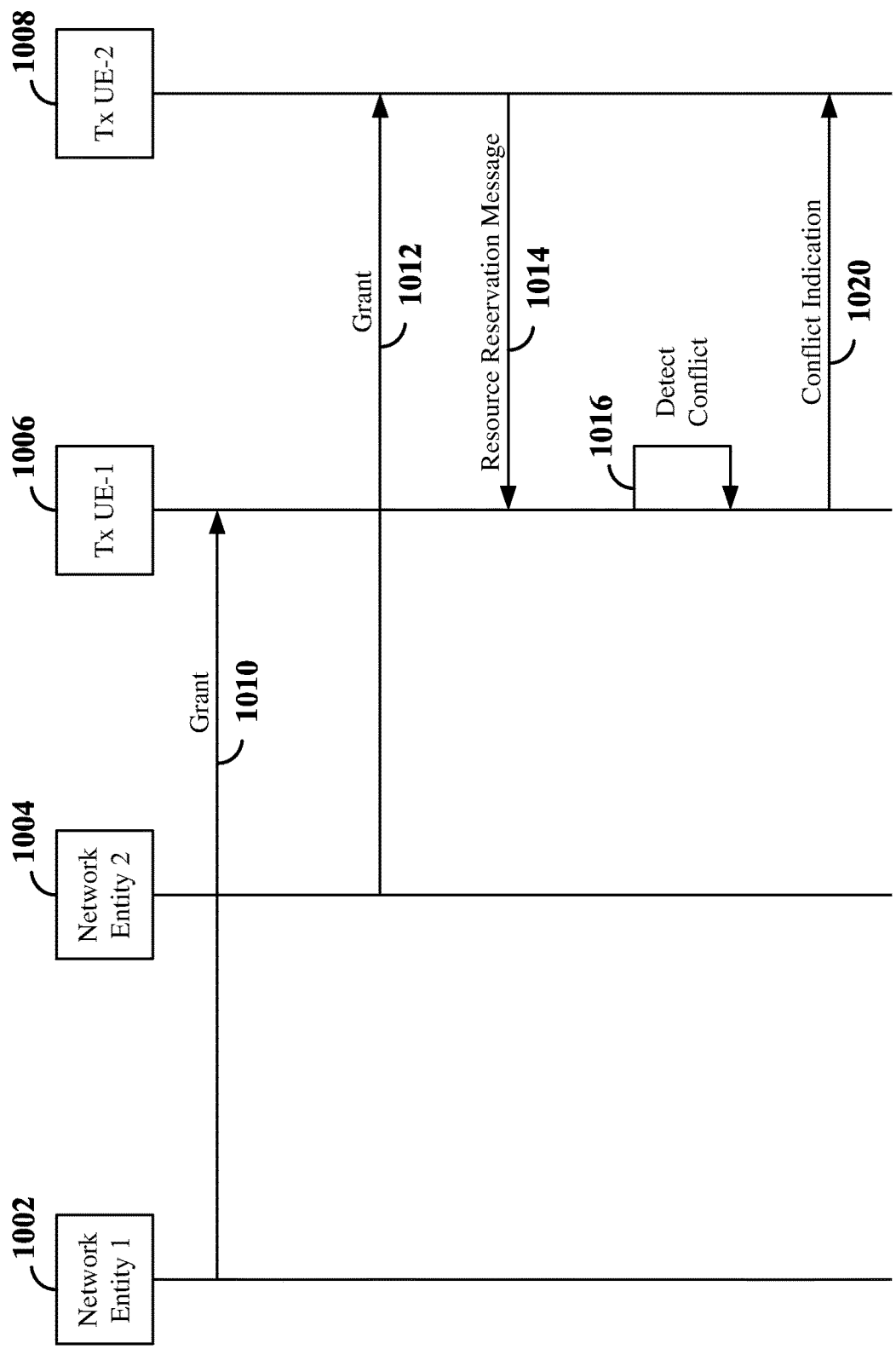
FIG. 10 is a diagram illustrating other exemplary signaling for coordinated sidelink communication according to some aspects.

FIG. 10 is a diagram illustrating exemplary signaling for coordinated sidelink communication between a first network entity (Network Entity 1) 1002, a second network entity (Network Entity 2) 1004, a first transmitting (Tx) UE (Tx UE-1) 1006, and a second Tx UE (Tx UE-2) 1008. Each of the network entities 1002 and 1004 may correspond to any of the base stations (e.g., gNBs) shown in any of FIGS. 1, 3, and/or 6. In some examples, the network entities 1002 and 1004 may be implemented as an aggregated base station or a disaggregated base station. In a disaggregated base station architecture, each of the network entities 1002 and 1004 may include one or more of a central unit (CU), a distributed unit (DU), or a radio unit (RU). Each of the UEs 1006 and 1008 may correspond, for example, to any of the UEs, sidelink devices, V2X devices, or other wireless communication devices shown in any of FIGS. 1, 3, and/or 6.

At 1010, the first network entity 1002 transmits a first grant to the first Tx UE 1006 of sidelink resources for one or more sidelink transmissions (e.g., an initial PSSCH and one or more retransmissions of the PSSCH or one or more new PSSCHs). At 1012, the second network entity 1004 transmits a second grant to the second Tx UE 1008 of sidelink resources for one or more sidelink transmissions (e.g., an initial PSSCH and one or more retransmissions of the PSSCH or one or more new PSSCHs).

At 1014, the second Tx UE 1008 transmits a first resource reservation message indicating a first resource granted by the second network entity 1004 for a first sidelink transmission. In some examples, the first resource is a future resource for a future new PSSCH or a future retransmission of a PSSCH. For example, the first resource reservation message may be received in slot n, while the first resource is in slot n+k.

At 1016, the first Tx UE 1006 detects a conflict between the first sidelink transmission and a second sidelink transmission of the first Tx UE 1006. The second sidelink transmission is scheduled on a second resource based on the first grant from the first network entity. For example, the first Tx UE 1006 may detect the conflict in response to the second resource being within a same slot as the first resource. In some examples, the first Tx UE 1006 may detect the conflict in response to the second resource at least partially overlapping the first resource in both time and frequency. In the example shown in FIG. 10, the first Tx UE 1006 is an intended recipient of the first sidelink transmission, as indicated in the destination ID of the first resource reservation message. Thus, the first Tx UE 1006 is prevented by the half-duplex constraint from both transmitting the second sidelink transmission and receiving the first sidelink transmission.

In response to detecting the conflict, at 1018, the first Tx UE 1006 transmits a conflict indication to the second Tx UE 1008. For example, the first Tx UE 1006 may transmit the conflict indication to the second Tx UE 1008 in response to a first priority of the first sidelink transmission of the second Tx UE 1008 being lower than a second priority of the second sidelink transmission of the first Tx UE 1006. In this example, the conflict indication may further include the second priority of the second sidelink transmission. Based on the conflict indication, the second Tx UE 1008 may cancel the first sidelink transmission, and may further report the conflict to the second network entity 1004, as described above.

Figure 11:
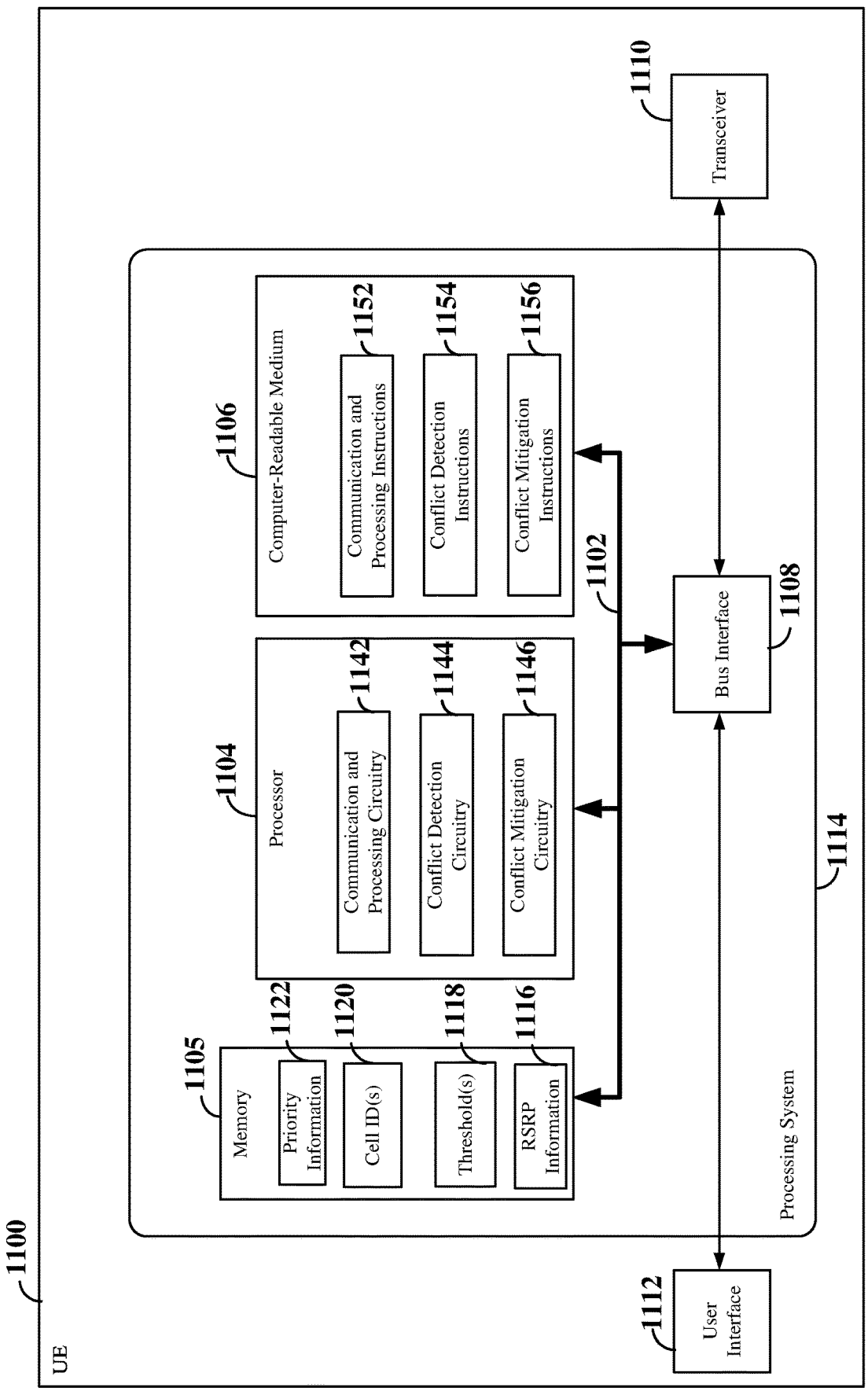
FIG. 11 is a block diagram illustrating an example of a hardware implementation for a UE employing a processing system according to some aspects.

FIG. 11 is a block diagram illustrating an example of a hardware implementation for a UE 1100 employing a processing system 1114. For example, the UE 1100 may correspond to a sidelink device, such as a V2X device, D2D device or other UE or wireless communication device configured for sidelink communication, as shown and described above in reference to FIGS. 1, 3, 6, 7, 9, and/or 10.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in the UE 1100, may be used to implement any one or more of the processes and procedures described below.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 links together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further.

A bus interface 1108 provides an interface between the bus 1102 and a transceiver 1110. The transceiver 1110 provides a communication interface or a means for communicating with various other apparatus over a transmission medium (e.g., air interface). Depending upon the nature of the apparatus, a user interface 1112 (e.g., keypad, display, touch screen, speaker, microphone, control knobs, etc.) may also be provided. Of course, such a user interface 1112 is optional, and may be omitted in some examples.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store one or more of RSRP information 1116 (e.g., one or more measured RSRP values), one or more threshold(s) 1118 (e.g., one or more RSRP thresholds, distance thresholds, etc.), one or more cell identifiers (IDs) 1120, and/or priority information 1122, which may be used by the processor 1104 in generating and processing sidelink transmissions and cellular (Uu) transmissions.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. In some examples, the computer-readable medium 1106 may be part of the memory 1105. Those skilled in the art will recognize how best to implement the described functionality presented throughout this disclosure depending on the particular application and the overall design constraints imposed on the overall system. In some examples, the computer-readable medium 1106 may be implemented on an article of manufacture, which may further include one or more other elements or circuits, such as the processor 1104 and/or memory 1105.

In some aspects of the disclosure, the processor 1104 may include circuitry configured for various functions. For example, the processor 1104 may include communication and processing circuitry 1142, configured to communicate with one or more sidelink devices (e.g., other wireless communication devices) via respective sidelinks (e.g., PC5 interfaces). In addition, the communication and processing circuitry 1142 may be configured to communicate with a network entity (e.g., a base station, such as a gNB or eNB) via a Uu link. In some examples, the communication and processing circuitry 1142 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1142 may include one or more transmit/receive chains.

In some implementations where the communication involves receiving information, the communication and processing circuitry 1142 may obtain information from a component of the UE 1100 (e.g., from the transceiver 1110 that receives the information via radio frequency signaling or some other type of signaling suitable for the applicable communication medium), process (e.g., decode) the information, and output the processed information. For example, the communication and processing circuitry 1142 may output the information to another component of the processor 1104, to the memory 1105, or to the bus interface 1108. In some examples, the communication and processing circuitry 1142 may receive one or more of signals, messages, other information, or any combination thereof. In some examples, the communication and processing circuitry 1142 may receive information via one or more channels. In some examples, the communication and processing circuitry 1142 may include functionality for a means for receiving. In some examples, the communication and processing circuitry 1142 may include functionality for a means for processing, including a means for demodulating, a means for decoding, etc.

In some implementations where the communication involves sending (e.g., transmitting) information, the communication and processing circuitry 1142 may obtain information (e.g., from another component of the processor 1104, the memory 1105, or the bus interface 1108), process (e.g., modulate, encode, etc.) the information, and output the processed information. For example, the communication and processing circuitry 1142 may output the information to the transceiver 1110 (e.g., that transmits the information via radio frequency signaling or some other type of signaling suitable for the applicable communication medium). In some examples, the communication and processing circuitry 1142 may send one or more of signals, messages, other information, or any combination thereof. In some examples, the communication and processing circuitry 1142 may send information via one or more channels. In some examples, the communication and processing circuitry 1142 may include functionality for a means for sending (e.g., a means for transmitting). In some examples, the communication and processing circuitry 1142 may include functionality for a means for generating, including a means for modulating, a means for encoding, etc.

In some examples, the communication and processing circuitry 1142 may be configured to receive, via the transceiver 1110, a first resource reservation message from a first transmitting UE indicating a first resource granted by a first network entity for a first sidelink transmission. The communication and processing circuitry 1142 may further be configured to transmit, via the transceiver 1110, a conflict indication in response to detecting a conflict between the first sidelink transmission and a second sidelink transmission scheduled on a second resource within a same slot as the first resource.

In some examples, the UE 1100 may be a third (stand-by) UE. In this example, the communication and processing circuitry 1142 may further be configured to receive a second resource reservation message from a second transmitting UE indicating the second resource granted by a second network entity for the second sidelink transmission, where the second resource is at least partially overlapping the first resource in both frequency and time. The communication and processing circuitry 1142 may further be configured to transmit the conflict indication to one of the first transmitting UE or the second transmitting UE. For example, the conflict indication may be transmitted to the first transmitting UE in a first feedback slot associated with the first resource reservation message or the first sidelink transmission or the second transmitting UE in a second feedback slot associated with second resource reservation message or the second sidelink transmission. In some examples, the conflict indication may be transmitted to either the first transmitting UE or the second transmitting UE within sidelink control information, a sidelink medium access control-control element (MAC-CE) or an additional sidelink physical channel.

In some examples, the UE 1100 may be a transmitting UE of the second sidelink transmission. In this example, the communication and processing circuitry 1142 may be configured to receive a grant of the second resource for the second sidelink transmission from a second network entity. In addition, the communication and processing circuitry 1142 may be configured to transmit the conflict indication to the second network entity either after a time at which the conflict would have occurred or prior to a time at which the conflict is scheduled to occur. In this example, the conflict indication may indicate a type of the conflict (e.g., inter-cell interference, half-duplex constraint, etc.). In some examples, the conflict indication may further include a cell ID 1120 associated with the first network entity. In some examples, the communication and processing circuitry 1142 may further be configured to receive a conflict report indicator from the second network entity and to transmit the conflict indication to the second network entity in response to the conflict report indicator enabling transmission of the conflict indication. In other examples, the communication and processing circuitry 1142 may further be configured to transmit the conflict indication to the first transmitting UE.

In some examples, the communication and processing circuitry 1142 may be configured to transmit a resource reservation message indicating a first resource granted by a network entity for a first sidelink transmission. In addition, the communication and processing circuitry 1142 may further be configured to receive a conflict indication from a receiving UE of the resource reservation message, the conflict indication indicating a conflict between the first sidelink transmission and a second sidelink transmission scheduled on a second resource within a same slot as the first resource.

The communication and processing circuitry 1142 may further be configured to transmit an additional conflict indication to the network entity indicating the conflict. For example, the additional conflict indication may be transmitted within a scheduling request (SR) resource, a feedback resource, or a buffer status report (BSR). The communication and processing circuitry 1142 may further be configured to execute communication and processing instructions (software) 1152 stored in the computer-readable medium 1106 to implement one or more of the functions described herein.

The processor 1104 may further include conflict detection circuitry 1144, configured to detect a conflict between the first sidelink transmission and the second sidelink transmission. In examples in which the UE 1100 is a third UE, the conflict detection circuitry 1144 may be configured to obtain a first cell ID from the first resource reservation message and a second cell ID from the second resource reservation message and to store the cell IDs 1120 within, for example, memory 1105. The conflict detection circuitry 1144 may then be configured to detect the conflict in response to the first cell ID being different than the second cell ID.

In some examples, the conflict detection circuitry 1144 may be configured to obtain (e.g., via the transceiver 1110) a first RSRP of the first resource reservation message and a second RSRP of the second resource reservation message and to store the RSRPs as the RSRP information 1116 within, for example, memory 1105. The conflict detection circuitry 1144 may then be configured to detect the conflict in response to determining that one of the first RSRP or the second RSRP is above a first RSRP threshold 1118.

In some examples, the conflict detection circuitry 1144 may be configured to determine a first priority of the first sidelink transmission and a second priority of the second sidelink transmission and to store the first and second priorities as the priority information 1122 within, for example, memory 1105. The conflict detection circuitry 1144 may then be configured to detect the conflict in response to the first priority being different than the second priority. In an example, the first priority may be less than the second priority.

In some examples, the UE 1100 may be an intended recipient of the first sidelink transmission. In this example, the conflict detection circuitry 1144 may be configured to detect the conflict between the first sidelink transmission and the second sidelink transmission in response to the first RSRP being below a second RSRP threshold 1118.

In some examples, the UE 1100 may be a transmitting UE of the second sidelink transmission. In this example, the conflict detection circuitry 1144 may be configured to detect the conflict in response to the first RSRP of the first resource reservation message being above a third RSRP threshold 1118. In other examples, the conflict detection circuitry 1144 may be configured to detect the conflict in response to the first priority being higher than the second priority. In some examples, the conflict detection circuitry 1144 may be configured to detect the conflict in response to the first priority being higher than the second priority and the RSRP of the first resource reservation message being greater than a fourth RSRP threshold 1118. In other examples, the conflict detection circuitry 1144 may be configured to detect the conflict in response to a distance between the UE 1100 and the first transmitting UE being less than a distance threshold 1118.

In some examples, the UE 1100 may be a transmitting UE of the second sidelink transmission and an intended recipient of the first sidelink transmission. In this example, the conflict detection circuitry 1144 may detect the conflict in response to the UE being an intended recipient of the first sidelink transmission (e.g., based on the half-duplex constraint).

In some examples, the conflict detection circuitry 1144 may be configured to detect a plurality of conflicts between a plurality of sidelink transmissions scheduled in overlapping resources. The conflict detection circuitry 1144 may further be configured to execute conflict detection instructions (software) 1154 stored in the computer-readable medium 1106 to implement one or more of the functions described herein.

The processor 1104 may further include conflict mitigation circuitry 1146, configured to mitigate the conflict between the first sidelink transmission and the second sidelink transmission. In examples in which the UE 1100 is a third (stand-by) UE, the conflict mitigation circuitry 1146 may be configured to compare the first RSRP with the second RSRP and to operate together with the communication and processing circuitry 1142 to transmit the conflict indication to one of the first transmitting UE or the second transmitting UE based on the comparison. For example, the conflict mitigation circuitry 1146 may be configured to transmit the conflict indication to the transmitting UE associated with a highest RSRP among the first and second RSRPs 1116 or a lowest RSRP among the first and second RSRPs 1116.

In some examples, the conflict mitigation circuitry 1146 may further be configured to operate together with the communication and processing circuitry 1142 to transmit the conflict indication to one of the first transmitting UE or the second transmitting UE in response to the conflict detection circuitry 1144 determining that the first cell ID associated with the first transmitting UE is different than the second cell ID associated with the second transmitting UE. In this example, the conflict mitigation circuitry 1146 may further be configured to transmit the conflict indication to one of the first transmitting UE or the second transmitting UE based on a comparison between the first RSRP 1116 and the second RSRP 1116, as described above.

In some examples, the conflict mitigation circuitry 1146 may be configured to operate together with the communication and processing circuitry 1142 to transmit the conflict indication to either the first transmitting UE in response to the conflict detection circuitry 1144 determining that the first RSRP is above the first RSRP threshold 1118 or to the second transmitting UE in response to the conflict detection circuitry 1144 determining that the second RSRP is above the first RSRP threshold 1118.

In some examples, the UE may be an intended recipient of the first sidelink transmission. In this example, the conflict mitigation circuitry 1146 may further be configured to operate together with the communication and processing circuitry 1142 to transmit the conflict indication to the first transmitting UE in response to the conflict detection circuitry 1144 determining that the first RSRP is below the second RSRP threshold 1118.

In some examples, the UE may be an intended recipient of both the first sidelink transmission and the second sidelink transmission. In this example, the conflict mitigation circuitry 1146 may be configured to compare the first RSRP 1116 with the second RSRP and to transmit the conflict indication to one of the first transmitting UE or the second transmitting UE based on the comparison. For example, the conflict mitigation circuitry 1146 may be configured to transmit the conflict indication to the transmitting UE associated with the highest or lowest RSRP.

In some examples, the conflict mitigation circuitry 1146 may be configured to operate together with the communication and processing circuitry 1142 to transmit the conflict indication to the first transmitting UE in response to the first priority being less than the second priority.

In some examples, the UE 1100 is a transmitting UE of the second sidelink transmission. In this example, the conflict mitigation circuitry 1146 may be configured to cancel the second sidelink transmission in response to the conflict detection circuitry 1144 detecting the conflict. In some examples, the conflict mitigation circuitry 1146 may further be configured to operate together with the communication and processing circuitry 1142 to transmit the conflict indication to the second network entity either prior to the time at which the conflict is scheduled to occur or after a time at which the conflict would have occurred. The conflict mitigation circuitry 1146 may further include a type of the conflict and/or a cell ID associated with the first network entity within the conflict indication. In some examples, the conflict indication may be transmitted within a scheduling request (SR) resource, a feedback resource, or a buffer status report. In some examples, the conflict mitigation circuitry 1146 may further be configured to operate together with the communication and processing circuitry 1142 to transmit the conflict indication to the second network entity in response to the second network entity enabling transmission of the conflict indication via the conflict report indicator. In some examples, the conflict mitigation circuitry 1146 may be configured to transmit the conflict indication to the first transmitting UE in response to the first priority being lower than the second priority. In this example, the conflict indication may include the second priority of the second sidelink transmission.

In some examples, the UE 1100 receives the conflict indication from a receiving UE (e.g., a UE that detects the conflict based on reception of a resource reservation message indicating a first resource granted by a network entity for a first sidelink transmission from the UE 1100). In this example, the conflict detection circuitry 1144 is configured to detect the conflict based on the conflict indication, and the conflict mitigation circuitry 1146 is configured to cancel transmission of the first sidelink transmission. In some examples, the conflict mitigation circuitry 1146 is further configured to operate together with the communication and processing circuitry 1142 to transmit an additional conflict indication to the network entity indicating the conflict. In some examples, the additional conflict indication may be transmitted within a scheduling request (SR) resource, a feedback resource, or a buffer status report. The conflict mitigation circuitry 1146 may further be configured to execute conflict mitigation instructions (software) 1156 stored in the computer-readable medium 1106 to implement one or more of the functions described herein.

Figure 12:
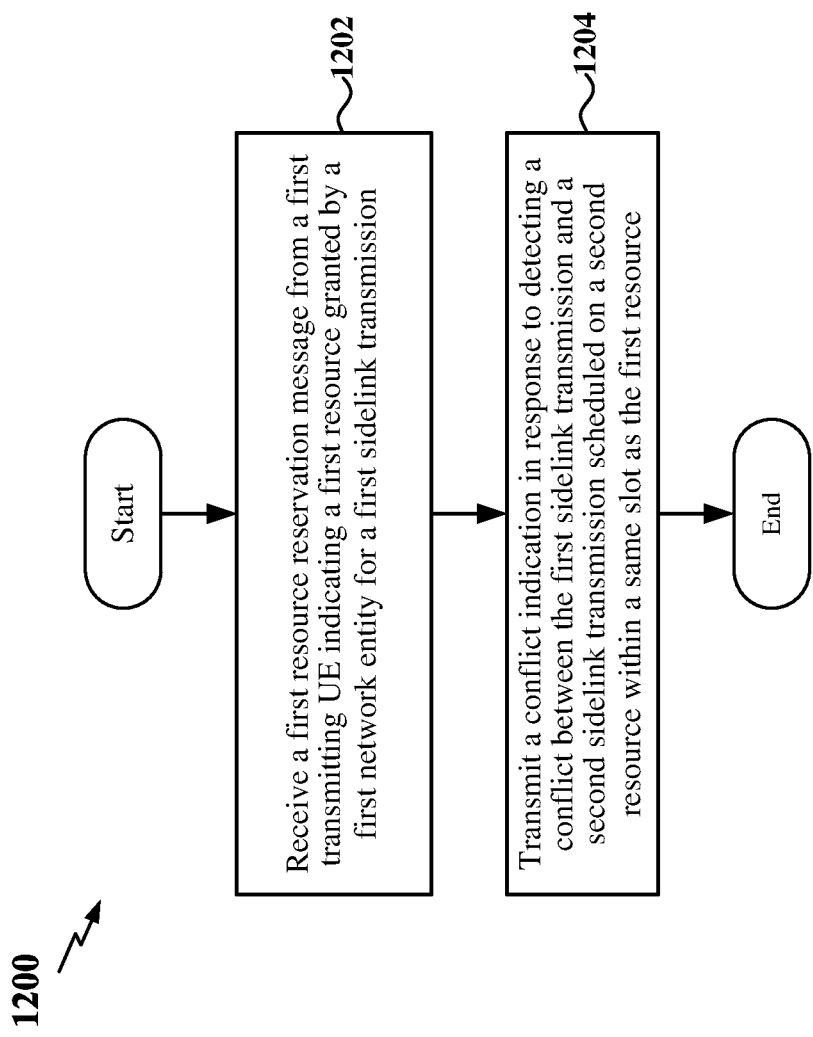
FIG. 12 is a flow chart of an exemplary process for coordinated sidelink communication according to some aspects.

FIG. 12 is a flow chart of an exemplary process 1200 for coordinated sidelink communication according to some aspects. As described below, some or all illustrated features may be omitted in a particular implementation within the scope of the present disclosure, and some illustrated features may not be required for implementation of all examples. In some examples, the method may be performed by the UE 1100, as described above and illustrated in FIG. 11, by a processor or processing system, or by any suitable means for carrying out the described functions.

At block 1202, the UE may receive a first resource reservation message from a first transmitting UE indicating a first resource granted by a first network entity for a first sidelink transmission. For example, the communication and processing circuitry 1142 and transceiver 1110, shown and described above in connection with FIG. 11, may provide a means to receive the first resource reservation message.

At block 1204, the UE may transmit a conflict indication in response to detecting a conflict between the first sidelink transmission and a second sidelink transmission scheduled on a second resource within a same slot as the first resource. For example, the communication and processing circuitry 1142, together with the conflict detection circuitry 1144, the conflict mitigation circuitry 1146, and the transceiver 1110, shown and described above in connection with FIG. 11, may provide a means to transmit the conflict indication.

Figure 13:
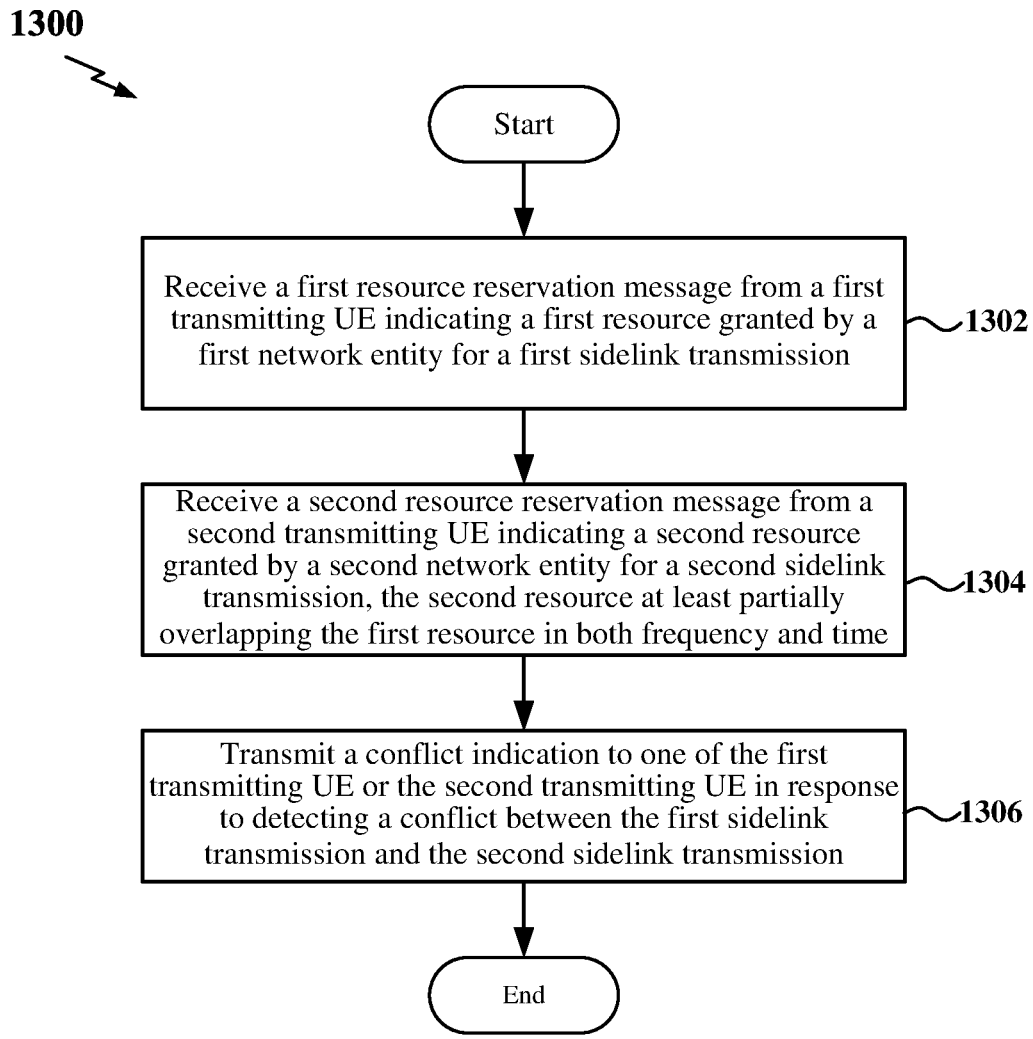
FIG. 13 is a flow chart of another exemplary process for coordinated sidelink communication according to some aspects.

FIG. 13 is a flow chart of another exemplary process 1300 for coordinated sidelink communication according to some aspects. As described below, some or all illustrated features may be omitted in a particular implementation within the scope of the present disclosure, and some illustrated features may not be required for implementation of all examples. In some examples, the method may be performed by the UE 1100, as described above and illustrated in FIG. 11, by a processor or processing system, or by any suitable means for carrying out the described functions.

At block 1302, the UE may receive a first resource reservation message from a first transmitting UE indicating a first resource granted by a first network entity for a first sidelink transmission. For example, the communication and processing circuitry 1142 and transceiver 1110, shown and described above in connection with FIG. 11, may provide a means to receive the first resource reservation message.

At block 1304, the UE may receive a second resource reservation message from a second transmitting UE indicating the second resource granted by a second network entity for the second sidelink transmission, the second resource at least partially overlapping the first resource in both frequency and time. For example, the communication and processing circuitry 1142 and transceiver 1110, shown and described above in connection with FIG. 11, may provide a means to receive the second resource reservation message.

At block 1306, the UE may transmit a conflict indication to the first transmitting UE or the second transmitting UE in response to detecting a conflict between the first sidelink transmission and the second sidelink transmission For example, the communication and processing circuitry 1142, together with the conflict detection circuitry 1144, the conflict mitigation circuitry 1146, and the transceiver 1110, shown and described above in connection with FIG. 11, may provide a means to transmit the conflict indication.

In some examples, the UE may compare a first reference signal received power (RSRP) of the first resource reservation message with a second RSRP of the second resource reservation message and transmit the conflict indication to one of the first transmitting UE or the second transmitting UE based on the comparison.

In some examples, the first resource reservation message includes a first cell identifier (ID) associated with the first network entity and the second resource reservation message includes a second cell ID associated with the second network entity. The UE may further compare the first cell ID to the second cell ID and transmit the conflict indication to one of the first transmitting UE or the second transmitting UE in response to the first cell ID being different than the second cell ID.

In some examples, the UE may determine that the UE is an intended recipient of the first sidelink transmission and obtain a reference signal received power (RSRP) of the first resource reservation message. The UE may then detect the conflict between the first sidelink transmission and the second sidelink transmission in response to the RSRP being below a threshold and transmit the conflict indication to the first transmitting UE.

In some examples, the UE may determine that the UE is an intended recipient of both the first sidelink transmission and the second sidelink transmission and compare a first RSRP of the first resource reservation message to a second RSRP of the second resource reservation message. The UE may then transmit the conflict indication to one of the first transmitting UE or the second transmitting UE based on the comparison.

In some examples, the UE may obtain a first reference signal received power (RSRP) of the first resource reservation message and a second RSRP of the second resource reservation message. The UE may the detect the conflict in response to determining that one of the first RSRP or the second RSRP is above a threshold and transmit the conflict indication to the first transmitting UE in response to the first RSRP being above the threshold or the second transmitting UE in response to the second RSRP being above the threshold.

In some examples, the UE may determine a first priority of the first sidelink transmission and a second priority of the second sidelink transmission and transmit the conflict indication to the first transmitting UE in response to the first priority being less than the second priority.

In some examples, the UE may transmit the conflict indication to the first transmitting UE in a first feedback slot associated with the first resource reservation message or the first sidelink transmission or the second transmitting UE in a second feedback slot associated with second resource reservation message or the second sidelink transmission. In some examples, the UE may transmit the conflict indication to either the first transmitting UE or the second transmitting UE within sidelink control information, a sidelink medium access control-control element (MAC-CE) or an additional sidelink physical channel.

Figure 14:
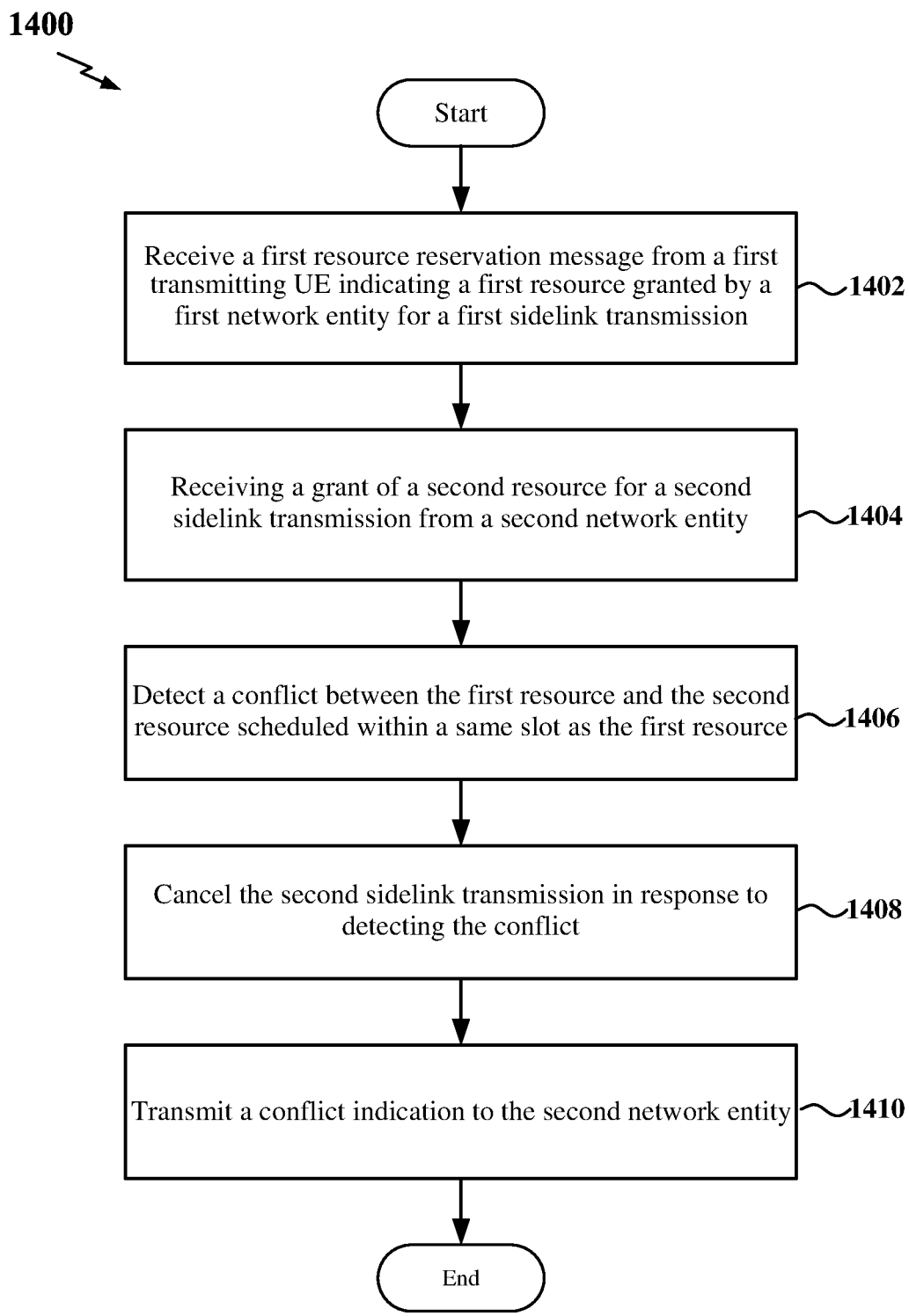
FIG. 14 is a flow chart of another exemplary process for coordinated sidelink communication according to some aspects.

FIG. 14 is a flow chart of another exemplary process 1400 for coordinated sidelink communication according to some aspects. As described below, some or all illustrated features may be omitted in a particular implementation within the scope of the present disclosure, and some illustrated features may not be required for implementation of all examples. In some examples, the method may be performed by the UE 1100, as described above and illustrated in FIG. 11, by a processor or processing system, or by any suitable means for carrying out the described functions.

At block 1402, the UE may receive a first resource reservation message from a first transmitting UE indicating a first resource granted by a first network entity for a first sidelink transmission. For example, the communication and processing circuitry 1142 and transceiver 1110, shown and described above in connection with FIG. 11, may provide a means to receive the first resource reservation message.

At block 1404, the UE may receive a grant of a second resource for a second sidelink transmission from a second network entity. For example, the communication and processing circuitry 1142 and transceiver 1110, shown and described above in connection with FIG. 11, may provide a means to receive the grant for the second sidelink transmission.

At block 1406, the UE may detect a conflict between the first resource and the second resource scheduled within a same slot as the first resource. For example, the conflict detection circuitry 1144 shown and described above in connection with FIG. 11 may provide a means to detect the conflict.

In some examples, the UE may detect the conflict in response to a reference signal received power (RSRP) of the first resource reservation message being above a threshold. In some examples, the UE may detect the conflict in response to a first priority of the first sidelink transmission being higher than a second priority of the second sidelink transmission. In some examples, the UE may detect the conflict further in response to a reference signal received power (RSRP) of the first resource reservation message being greater than a threshold. In some examples, the UE may detect the conflict in response to a distance between the UE and the first transmitting UE being less than a threshold. In some examples, the UE may detect the conflict in response to determining that the UE is an intended recipient of the first sidelink transmission.

At block 1408, the UE may cancel the second sidelink transmission in response to detecting the conflict. For example, the conflict mitigation circuitry 1146 shown and described above in connection with FIG. 11 may provide a means to cancel the second sidelink transmission. In examples in which the UE is an intended recipient of the first sidelink transmission, the UE may cancel the second sidelink transmission in response to a first priority of the first transmitting UE being higher than a second priority of the UE.

At block 1410, the UE may transmit a conflict indication to the second network entity. For example, the communication and processing circuitry 1142, together with the conflict mitigation circuitry 1146 and transceiver 1110, shown and described above in connection with FIG. 11 may provide a means to transmit the conflict indication.

In some examples, the UE may transmit the conflict indication to the second network entity after a time at which the conflict would have occurred. The conflict indication may further indicate a type of the conflict. In some examples, the UE may transmit the conflict indication to the second network entity prior to a time at which the conflict is scheduled to occur. The conflict indication may indicate a type of the conflict. In some examples, the conflict indication may further include a cell identifier (ID) associated with the first network entity.

In some examples, the UE may transmit the conflict indication to the second network entity in response to detecting a plurality of conflicts between a plurality of sidelink transmissions scheduled in overlapping resources. In some examples, the UE may receive a conflict report indicator from the second network entity and transmit the conflict indication to the second network entity in response to the conflict report indicator enabling transmission of the conflict indication.

Figure 15:
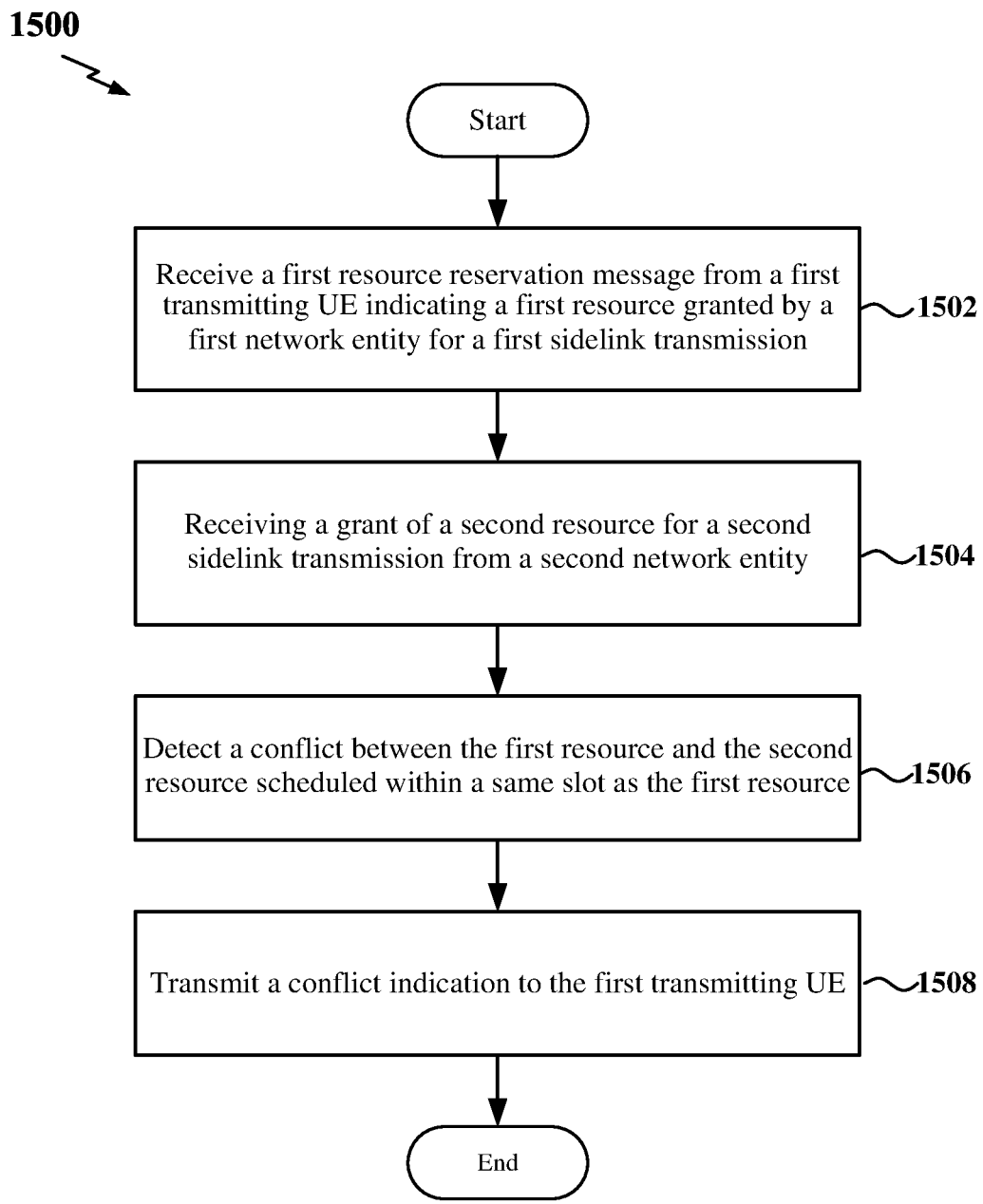
FIG. 15 is a flow chart of another exemplary process for coordinated sidelink communication according to some aspects.

FIG. 15 is a flow chart of another exemplary process 1500 for coordinated sidelink communication according to some aspects. As described below, some or all illustrated features may be omitted in a particular implementation within the scope of the present disclosure, and some illustrated features may not be required for implementation of all examples. In some examples, the method may be performed by the UE 1100, as described above and illustrated in FIG. 11, by a processor or processing system, or by any suitable means for carrying out the described functions.

At block 1502, the UE may receive a first resource reservation message from a first transmitting UE indicating a first resource granted by a first network entity for a first sidelink transmission. For example, the communication and processing circuitry 1142 and transceiver 1110, shown and described above in connection with FIG. 11, may provide a means to receive the first resource reservation message.

At block 1504, the UE may receive a grant of a second resource for a second sidelink transmission from a second network entity. For example, the communication and processing circuitry 1142 and transceiver 1110, shown and described above in connection with FIG. 11, may provide a means to receive the grant for the second sidelink transmission.

At block 1506, the UE may detect a conflict between the first resource and the second resource scheduled within a same slot as the first resource. For example, the conflict detection circuitry 1144 shown and described above in connection with FIG. 11 may provide a means to detect the conflict.

At block 1508, the UE may transmit a conflict indication to the first transmitting UE. For example, the communication and processing circuitry 1142, together with the conflict mitigation circuitry 1146 and transceiver 1110, shown and described above in connection with FIG. 11 may provide a means to transmit the conflict indication. In some examples, the UE may transmit the conflict indication to the first transmitting UE in response to a first priority of the first sidelink transmission being lower than a second priority of the second sidelink transmission. The conflict indication may further include the second priority of the second sidelink transmission.

In one configuration, the UE 1100 includes means for receiving a first resource reservation message from a first transmitting UE indicating a first resource granted by a first network entity for a first sidelink transmission and means for transmitting a conflict indication in response to detecting a conflict between the first sidelink transmission and a second sidelink transmission scheduled on a second resource within a same slot as the first resource. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 3, 6, 7, 9, and/or 10, and utilizing, for example, the processes and/or algorithms described herein in relation to FIGS. 12-15.

Figure 16:
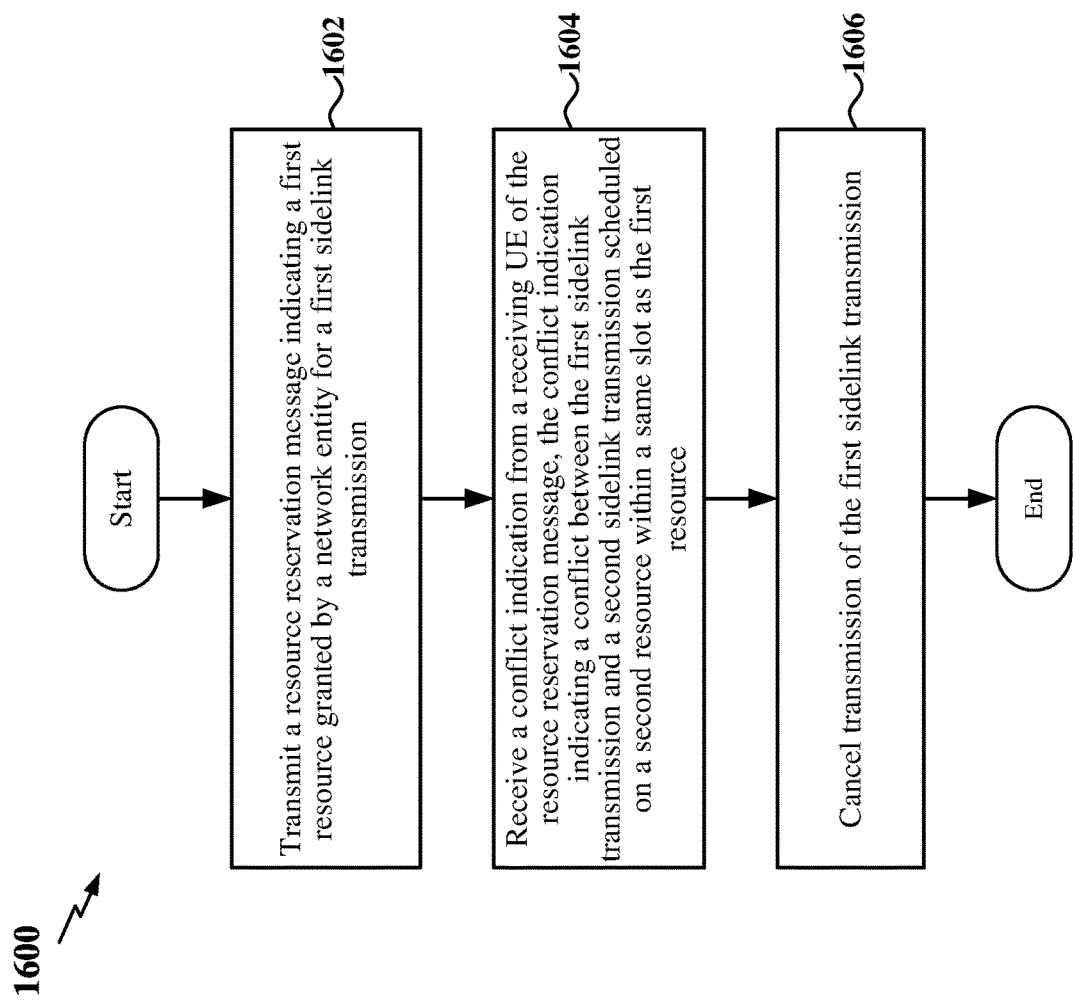
FIG. 16 is a flow chart of another exemplary process for coordinated sidelink communication according to some aspects.

FIG. 16 is a flow chart of another exemplary process 1600 for coordinated sidelink communication according to some aspects. As described below, some or all illustrated features may be omitted in a particular implementation within the scope of the present disclosure, and some illustrated features may not be required for implementation of all examples. In some examples, the method may be performed by the UE 1100, as described above and illustrated in FIG. 11, by a processor or processing system, or by any suitable means for carrying out the described functions.

At block 1602, the UE may transmit a resource reservation message indicating a first resource granted by a network entity for a first sidelink transmission. For example, the communication and processing circuitry 1142 and transceiver 1110, shown and described above in connection with FIG. 11, may provide a means to transmit the resource reservation message.

At block 1604, the UE may receive a conflict indication from a receiving UE of the resource reservation message. The conflict indication indicates a conflict between the first sidelink transmission and a second sidelink transmission scheduled on a second resource within a same slot as the first resource. For example, the communication and processing circuitry 1142 and transceiver 1110, shown and described above in connection with FIG. 11, may provide a means to receive the conflict indication.

At block 1606, the UE may cancel transmission of the first sidelink transmission. For example, the conflict detection circuitry 1144 and the conflict mitigation circuitry 1146, shown and described above in connection with FIG. 11, may provide a means to cancel the first sidelink transmission.

Figure 17:
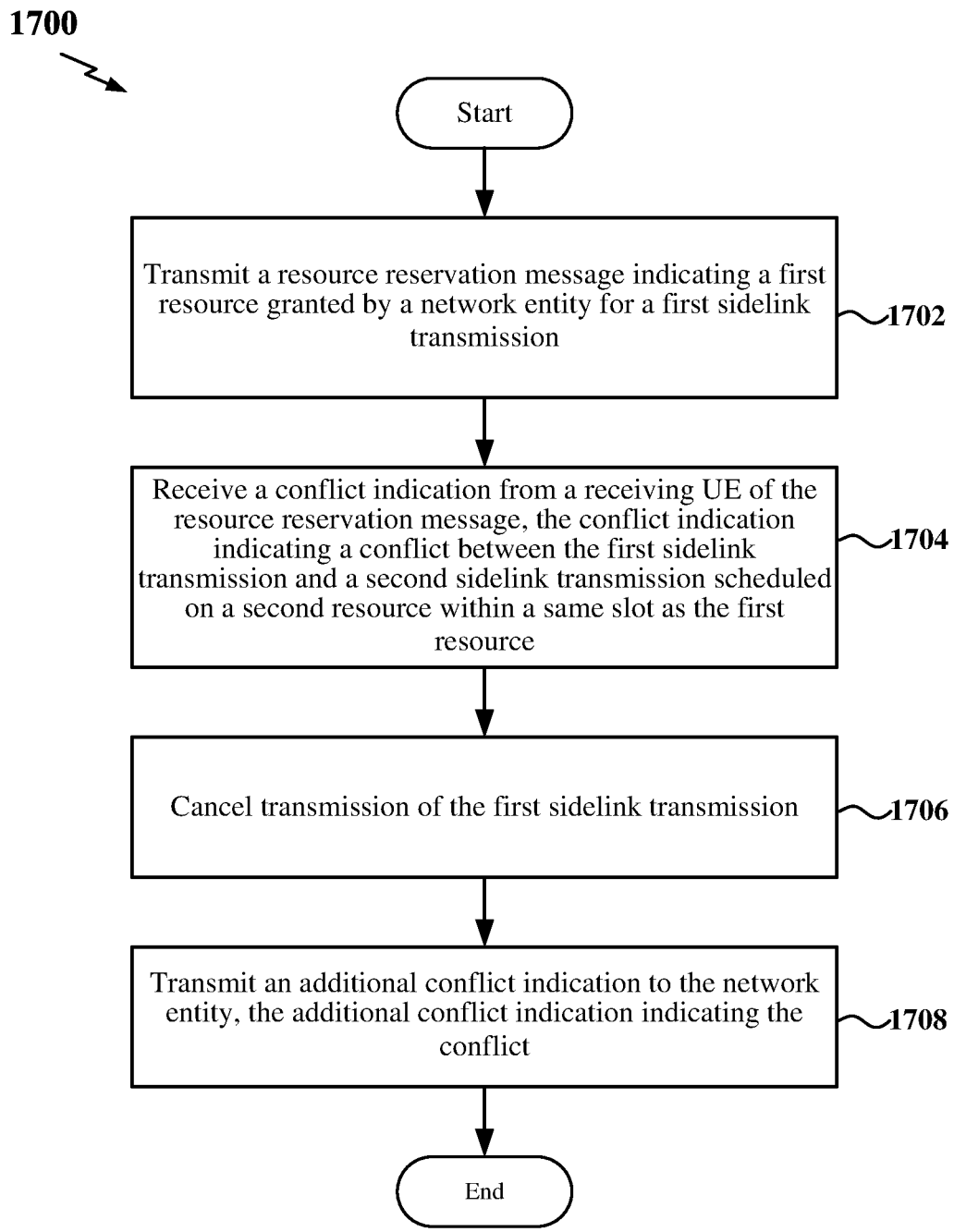
FIG. 17 is a flow chart of another exemplary process for coordinated sidelink communication according to some aspects.

FIG. 17 is a flow chart of another exemplary process 1700 for coordinated sidelink communication according to some aspects. As described below, some or all illustrated features may be omitted in a particular implementation within the scope of the present disclosure, and some illustrated features may not be required for implementation of all examples. In some examples, the method may be performed by the UE 1100, as described above and illustrated in FIG. 11, by a processor or processing system, or by any suitable means for carrying out the described functions.

At block 1702, the UE may transmit a resource reservation message indicating a first resource granted by a network entity for a first sidelink transmission. For example, the communication and processing circuitry 1142 and transceiver 1110, shown and described above in connection with FIG. 11, may provide a means to transmit the resource reservation message.

At block 1704, the UE may receive a conflict indication from a receiving UE of the resource reservation message. The conflict indication indicates a conflict between the first sidelink transmission and a second sidelink transmission scheduled on a second resource within a same slot as the first resource. For example, the communication and processing circuitry 1142 and transceiver 1110, shown and described above in connection with FIG. 11, may provide a means to receive the conflict indication.

At block 1706, the UE may cancel transmission of the first sidelink transmission. For example, the conflict detection circuitry 1144 and the conflict mitigation circuitry 1146, shown and described above in connection with FIG. 11, may provide a means to cancel the first sidelink transmission.

At block 1708, the UE may transmit an additional conflict indication to the network entity. The additional conflict indication indicates the conflict. For example, the communication and processing circuitry 1142, together with the conflict mitigation circuitry 1146 and transceiver 1110, may provide a means to transmit the additional conflict indication.

In one configuration, the UE 1100 includes means for transmitting a resource reservation message indicating a first resource granted by a network entity for a first sidelink transmission, means for receiving a conflict indication from a receiving UE of the resource reservation message, the conflict indication indicating a conflict between the first sidelink transmission and a second sidelink transmission scheduled on a second resource within a same slot as the first resource, and means for canceling transmission of the first sidelink transmission. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 3, 6, 7, 9, and/or 10, and utilizing, for example, the processes and/or algorithms described herein in relation to FIGS. 16 and 17.

The processes and/or algorithms shown in FIGS. 7, 9, 10, and 12-17 may include additional aspects, such as any single aspect or any combination of aspects described below and/or in connection with one or more other processes described elsewhere herein.

Aspect 1: A method for wireless communication at a user equipment (UE), the method comprising: receiving a first resource reservation message from a first transmitting UE indicating a first resource granted by a first network entity for a first sidelink transmission; and transmitting a conflict indication in response to detecting a conflict between the first sidelink transmission and a second sidelink transmission scheduled on a second resource within a same slot as the first resource.

Aspect 2: The method of aspect 1, further comprising: receiving a second resource reservation message from a second transmitting UE indicating the second resource granted by a second network entity for the second sidelink transmission, the second resource at least partially overlapping the first resource in both frequency and time.

Aspect 3: The method of aspect 2, wherein the transmitting the conflict indication further comprises: comparing a first reference signal received power (RSRP) of the first resource reservation message with a second RSRP of the second resource reservation message; and transmitting the conflict indication to one of the first transmitting UE or the second transmitting UE based on the comparison.

Aspect 4: The method of aspect 2 or 3, wherein the first resource reservation message comprises a first cell identifier (ID) associated with the first network entity and the second resource reservation message comprises a second cell ID associated with the second network entity, and wherein the transmitting the conflict indication comprises: comparing the first cell ID to the second cell ID; and transmitting the conflict indication to one of the first transmitting UE or the second transmitting UE in response to the first cell ID being different than the second cell ID.

Aspect 5: The method of aspect 2, wherein the transmitting the conflict indication further comprises: determining that the UE is an intended recipient of the first sidelink transmission; obtaining a reference signal received power (RSRP) of the first resource reservation message; detecting the conflict between the first sidelink transmission and the second sidelink transmission in response to the RSRP being below a threshold; and transmitting the conflict indication to the first transmitting UE.

Aspect 6: The method of aspect 2, wherein the transmitting the conflict indication further comprises: determining that the UE is an intended recipient of both the first sidelink transmission and the second sidelink transmission; comparing a first reference signal received power (RSRP) of the first resource reservation message and a second RSRP of the second resource reservation message; and transmitting the conflict indication to one of the first transmitting UE or the second transmitting UE based on the comparison.

Aspect 7: The method of aspect 2, wherein the transmitting the conflict indication further comprises: obtaining a first reference signal received power (RSRP) of the first resource reservation message and a second RSRP of the second resource reservation message; detecting the conflict in response to determining that one of the first RSRP or the second RSRP is above a threshold; and transmitting the conflict indication to the first transmitting UE in response to the first RSRP being above the threshold or the second transmitting UE in response to the second RSRP being above the threshold.

Aspect 8: The method of aspect 2, wherein the transmitting the conflict indication further comprises: determining a first priority of the first sidelink transmission and a second priority of the second sidelink transmission; and transmitting the conflict indication to the first transmitting UE in response to the first priority being less than the second priority.

Aspect 9: The method of any of aspects 2 through 8, wherein the transmitting the conflict indication further comprises: transmitting the conflict indication to the first transmitting UE in a first feedback slot associated with the first resource reservation message or the first sidelink transmission or the second transmitting UE in a second feedback slot associated with the second resource reservation message or the second sidelink transmission.

Aspect 10: The method of any of aspects 2 through 8, wherein the transmitting the conflict indication further comprises: transmitting the conflict indication to either the first transmitting UE or the second transmitting UE within sidelink control information, a sidelink medium access control-control element (MAC-CE) or an additional sidelink physical channel.

Aspect 11: The method of aspect 1, further comprising: receiving a grant of the second resource for the second sidelink transmission from a second network entity; and canceling the second sidelink transmission in response to detecting the conflict.

Aspect 12: The method of aspect 11, further comprising: detecting the conflict in response to a reference signal received power (RSRP) of the first resource reservation message being above a threshold.

Aspect 13: The method of aspect 11, further comprising: detecting the conflict in response to a first priority of the first sidelink transmission being higher than a second priority of the second sidelink transmission.

Aspect 14: The method of aspect 13, wherein the detecting the conflict further comprises: detecting the conflict further in response to a reference signal received power (RSPP) of the first resource reservation message being greater than a threshold.

Aspect 15: The method of aspect 11, further comprising: detecting the conflict in response to a distance between the UE and the first transmitting UE being less than a threshold.

Aspect 16: The method of aspect 11, wherein the transmitting the conflict indication further comprises: transmitting the conflict indication to the second network entity after a time at which the conflict would have occurred, the conflict indication indicating a type of the conflict.

Aspect 17: The method of aspect 11, wherein the transmitting the conflict indication further comprises: transmitting the conflict indication to the second network entity prior to a time at which the conflict is scheduled to occur, the conflict indication indicating a type of the conflict.

Aspect 18: The method of aspect 11, wherein the conflict indication further includes a cell identifier (ID) associated with the first network entity.

Aspect 19: The method of aspect 11, further comprising: detecting the conflict in response to determining that the UE is an intended recipient of the first sidelink transmission.

Aspect 20: The method of aspect 19, wherein the canceling the second sidelink transmission further comprises: canceling the second sidelink transmission in response to a first priority of the first transmitting UE being higher than a second priority of the UE.

Aspect 21: The method of any of aspects 11 through 20, wherein the transmitting the conflict indication further comprises: transmitting the conflict indication to the second network entity in response to detecting a plurality of conflicts between a plurality of sidelink transmissions scheduled in overlapping resources.

Aspect 22: The method of any of aspects 11 through 21, further comprising: receiving a conflict report indicator from the second network entity; and transmitting the conflict indication to the second network entity in response to the conflict report indicator enabling transmission of the conflict indication.

Aspect 23: The method of aspect 1, further comprising: receiving a grant of the second resource for the second sidelink transmission from a second network entity; and transmitting the conflict indication to the first transmitting UE in response to a first priority of the first sidelink transmission being lower than a second priority of the second sidelink transmission, wherein the conflict indication comprises the second priority of the second sidelink transmission.

Aspect 24: A method for wireless communication at a user equipment (UE), the method comprising: transmitting a resource reservation message indicating a first resource granted by a network entity for a first sidelink transmission; receiving a conflict indication from a receiving UE of the resource reservation message, the conflict indication indicating a conflict between the first sidelink transmission and a second sidelink transmission scheduled on a second resource within a same slot as the first resource; and canceling transmission of the first sidelink transmission.

Aspect 25: The method of aspect 24, further comprising: transmitting an additional conflict indication to the network entity, the additional conflict indication indicating the conflict.

Aspect 26: The method of aspect 25, wherein the transmitting the additional conflict indication further comprises: transmitting the additional conflict indication within a scheduling request (SR) resource, a feedback resource, or a buffer status report.

Aspect 27: A UE comprising a transceiver, a memory, and a processor coupled to the transceiver and the memory, the processor and the memory configured to perform a method of any one of aspects 1 through 23 or 24 through 26.

Aspect 28: A UE comprising means for performing a method of any one of aspects 1 through 23 or 24 through 26.

Aspect 29: An article of manufacture comprising a non-transitory computer-readable medium having stored therein instructions executable by one or more processors of a UE to perform a method of any one of aspects 1 through 23 or 24 through 26.

Aspect 30: In any of the above aspects 1 through 29, wherein the aspect is applied to or otherwise comprises, at least in part, sidelink communication comprising a "Mode 1" sidelink communication mode (or the like) of a plurality of sidelink communication modes.

Aspect 31: In aspect 30, wherein the plurality of sidelink communication modes further comprises at least a "Mode 2" sidelink communication mode (or the like).

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-17 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 3, 6, 7, 9, 10 and/or 11 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) configured for wireless communication, comprising:
    a transceiver;
    a memory; and
    a processor coupled to the transceiver and the memory, the processor being configured to:
        receive a first resource reservation message via the transceiver from a first transmitting UE indicating a first resource granted by a first network entity for a first sidelink transmission; and
        transmit a conflict indication via the transceiver in response to detecting a conflict between the first sidelink transmission and a second sidelink transmission scheduled on a second resource within a same slot as the first resource, wherein the conflict is detected based at least in part on a first reference signal received power (RSRP) of the first resource reservation message.

2. The UE of claim 1, wherein the processor is further configured to:
    receive a second resource reservation message from a second transmitting UE indicating the second resource granted by a second network entity for the second sidelink transmission, the second resource at least partially overlapping the first resource in both frequency and time.

3. The UE of claim 2, wherein the processor is further configured to:
    compare the first RSRP of the first resource reservation message with a second RSRP of the second resource reservation message; and
    transmit the conflict indication to one of the first transmitting UE or the second transmitting UE based on the comparison.

4. The UE of claim 2, wherein the first resource reservation message comprises a first cell identifier (ID) associated with the first network entity and the second resource reservation message comprises a second cell ID associated with the second network entity, and wherein the processor is further configured to:
    compare the first cell ID to the second cell ID; and
    transmit the conflict indication to one of the first transmitting UE or the second transmitting UE in response to the first cell ID being different than the second cell ID.

5. The UE of claim 2, wherein the processor is further configured to:
    determine that the UE is an intended recipient of the first sidelink transmission;
    obtain the first RSRP of the first resource reservation message;
    detect the conflict between the first sidelink transmission and the second sidelink transmission in response to the RSRP being below a threshold; and
    transmit the conflict indication to the first transmitting UE.

6. The UE of claim 2, wherein the processor is further configured to:
    determine that the UE is an intended recipient of both the first sidelink transmission and the second sidelink transmission;
    compare the first RSRP of the first resource reservation message and a second RSRP of the second resource reservation message; and
    transmit the conflict indication to one of the first transmitting UE or the second transmitting UE based on the comparison.

7. The UE of claim 2, wherein the processor is further configured to:
    obtain the first RSRP of the first resource reservation message and a second RSRP of the second resource reservation message;
    detect the conflict in response to determining that one of the first RSRP or the second RSRP is above a threshold; and
    transmit the conflict indication to the first transmitting UE in response to the first RSRP being above the threshold or the second transmitting UE in response to the second RSRP being above the threshold.

8. The UE of claim 2, wherein the processor is further configured to:
    determine a first priority of the first sidelink transmission and a second priority of the second sidelink transmission; and
    transmit the conflict indication to the first transmitting UE in response to the first priority being less than the second priority.

9. The UE of claim 2, wherein the processor is further configured to:
    transmit the conflict indication to the first transmitting UE in a first feedback slot associated with the first resource reservation message or the first sidelink transmission or the second transmitting UE in a second feedback slot associated with the second resource reservation message or the second sidelink transmission.

10. The UE of claim 2, wherein the processor is further configured to:
    transmit the conflict indication to either the first transmitting UE or the second transmitting UE within sidelink control information, a sidelink medium access control-control element (MAC-CE) or an additional sidelink physical channel.

11. The UE of claim 1, wherein the processor is further configured to:
    receive a grant of the second resource for the second sidelink transmission from a second network entity; and
    cancel the second sidelink transmission in response to detecting the conflict.

12. The UE of claim 11, wherein the processor is further configured to:
   detect the conflict in response to the first RSRP of the first resource reservation message being above a threshold.
13. The UE of claim 11, wherein the processor is further configured to:
   detect the conflict in response to a first priority of the first sidelink transmission being higher than a second priority of the second sidelink transmission.
14. The UE of claim 13, wherein the processor is further configured to:
   detect the conflict further in response to a reference signal received power (RSPP) of the first resource reservation message being greater than a threshold.
15. The UE of claim 11, wherein the processor is further configured to:
   detect the conflict in response to a distance between the UE and the first transmitting UE being less than a threshold.
16. The UE of claim 11, wherein the processor is further configured to:
   transmit the conflict indication to the second network entity after a time at which the conflict would have occurred, the conflict indication indicating a type of the conflict.
17. The UE of claim 11, wherein the processor is further configured to:
   transmit the conflict indication to the second network entity prior to a time at which the conflict is scheduled to occur, the conflict indication indicating a type of the conflict.
18. The UE of claim 17, wherein the conflict indication further includes a cell identifier (ID) associated with the first network entity.
19. The UE of claim 11, wherein the processor is further configured to:
   detect the conflict in response to determining that the UE is an intended recipient of the first sidelink transmission.
20. The UE of claim 19, wherein the processor is further configured to:
   cancel the second sidelink transmission in response to a first priority of the first transmitting UE being higher than a second priority of the UE.
21. The UE of claim 11, wherein the processor is further configured to:
   transmit the conflict indication to the second network entity in response to detecting a plurality of conflicts between a plurality of sidelink transmissions scheduled in overlapping resources.
22. The UE of claim 11, wherein the processor is further configured to:
   receive a conflict report indicator from the second network entity; and
   transmit the conflict indication to the second network entity in response to the conflict report indicator enabling transmission of the conflict indication.
23. The UE of claim 1, wherein the processor is further configured to:
   receive a grant of the second resource for the second sidelink transmission from a second network entity; and
   transmit the conflict indication to the first transmitting UE in response to a first priority of the first sidelink transmission being lower than a second priority of the second sidelink transmission, wherein the conflict indication comprises the second priority of the second sidelink transmission.
24. A method for wireless communication at a user equipment (UE), the method comprising:
   receiving a first resource reservation message from a first transmitting UE indicating a first resource granted by a first network entity for a first sidelink transmission; and
   transmitting a conflict indication in response to detecting a conflict between the first sidelink transmission and a second sidelink transmission scheduled on a second resource within a same slot as the first resource, wherein the conflict is detected based at least in part on a first reference signal received power (RSRP) of the first resource reservation message.
25. The method of claim 24, further comprising:
   receiving a second resource reservation message from a second transmitting UE indicating the second resource granted by a second network entity for the second sidelink transmission, the second resource at least partially overlapping the first resource in both frequency and time.
26. The method of claim 24, further comprising:
   receiving a grant of the second resource for the second sidelink transmission from a second network entity; and
   canceling the second sidelink transmission in response to detecting the conflict.
27. A user equipment (UE) configured for wireless communication, comprising:
   a transceiver;
   a memory; and
   a processor coupled to the transceiver and the memory, the processor being configured to:
      transmit a resource reservation message via the transceiver indicating a first resource granted by a network entity for a first sidelink transmission;
      receive a conflict indication via the transceiver from a receiving UE of the resource reservation message, the conflict indication indicating a conflict between the first sidelink transmission and a second sidelink transmission scheduled on a second resource within a same slot as the first resource, wherein the conflict is detected based at least in part on a first reference signal received power (RSRP) of the first resource reservation message; and
      cancel transmission of the first sidelink transmission.
28. The UE of claim 27, wherein the processor is further configured to:
   transmit an additional conflict indication to the network entity, the additional conflict indication indicating the conflict.
29. The UE of claim 28, wherein the processor is further configured to:
   transmit the additional conflict indication within a scheduling request (SR) resource, a feedback resource, or a buffer status report.
30. A method for wireless communication at a user equipment (UE), the method comprising:
   transmitting a resource reservation message indicating a first resource granted by a network entity for a first sidelink transmission;
   receiving a conflict indication from a receiving UE of the resource reservation message, the conflict indication indicating a conflict between the first sidelink transmission and a second sidelink transmission scheduled on a second resource within a same slot as the first resource, wherein the conflict is detected based at least in part on a first reference signal received power (RSRP) of the first resource reservation message; and canceling transmission of the first sidelink transmission.

\* \* \* \* \*